(12) United States Patent
Zain et al.

(10) Patent No.: US 9,304,953 B2
(45) Date of Patent: Apr. 5, 2016

(54) MEMORY CONTROLLER DEVICES, SYSTEMS AND METHODS FOR TRANSLATING MEMORY REQUESTS BETWEEN FIRST AND SECOND FORMATS FOR HIGH RELIABILITY MEMORY DEVICES

(75) Inventors: Suhail Zain, San Ramon, CA (US); Helmut Puchner, Santa Clara, CA (US); Walt Anderson, Dublin, CA (US); Karthik Navalpakam, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 332 days.

(21) Appl. No.: 13/537,877

(22) Filed: Jun. 29, 2012

(65) Prior Publication Data
US 2014/0006730 A1 Jan. 2, 2014

(51) Int. Cl.
G06F 12/00 (2006.01)
G06F 13/16 (2006.01)

(52) U.S. Cl.
CPC ........ *G06F 13/1668* (2013.01); *G06F 13/1673* (2013.01); *G06F 13/1694* (2013.01); *G06F 12/00* (2013.01)

(58) Field of Classification Search
CPC ............ G06F 13/1668; G06F 13/1694; G06F 2212/1004; G06F 2213/3852
See application file for complete search history.

(56) References Cited

U.S. PATENT DOCUMENTS

| | | | |
|---|---|---|---|
| 5,173,873 A | 12/1992 | Wu et al. | |
| 5,315,544 A | 5/1994 | Yokote et al. | |
| 6,147,899 A | 11/2000 | Chan | |
| 6,194,276 B1 | 2/2001 | Chan et al. | |
| 6,795,906 B2 * | 9/2004 | Matsuda | 711/167 |
| 6,971,039 B2 * | 11/2005 | Krause et al. | 713/400 |
| 6,990,010 B1 | 1/2006 | Plants | |
| 7,142,477 B1 * | 11/2006 | Tran et al. | 365/230.02 |
| 7,243,254 B1 * | 7/2007 | Kuroodi et al. | 713/600 |
| 7,308,526 B2 * | 12/2007 | Lakshmanamurthy et al. | 711/104 |
| 7,426,133 B2 | 9/2008 | Hynes et al. | |
| 7,661,010 B2 * | 2/2010 | DeFazio et al. | 713/500 |
| 7,685,464 B2 | 3/2010 | Kimmery et al. | |
| 7,898,835 B2 | 3/2011 | Kashiwa | |
| 2007/0242537 A1 | 10/2007 | Golke et al. | |
| 2009/0238021 A1 * | 9/2009 | Ban et al. | 365/222 |

(Continued)

OTHER PUBLICATIONS

QDR II SRAM Interface for Virtex-5 Devices, Xilinx Application Note XAPP853 (v1.3), author Lakshmi Gopalakrishnan, Jun. 7, 2010, pp. 1-18.*

(Continued)

*Primary Examiner* — Sanjiv Shah
*Assistant Examiner* — Glenn Gossage

(57) ABSTRACT

A device can include an interface circuit configured to translate memory access requests at a controller interface of the interface circuit into signals at a memory device interface of the interface circuit that is different from the controller interface, the interface circuit including a write buffer memory configured to store a predetermined number of data values received at a write input of the controller interface, and a read buffer memory configured to mirror a predetermined number of data values stored in the write buffer memory; wherein the memory device interface comprises an address output configured to transmit address values, a write data output configured to transmit write data on rising and falling edges of a periodic signal, and a read data input configured to receive read data at the same rate as the write data.

6 Claims, 21 Drawing Sheets

(56) References Cited

U.S. PATENT DOCUMENTS

2009/0319253 A1    12/2009    Phillips et al.
2011/0107158 A1    5/2011    Espinosa et al.

OTHER PUBLICATIONS

LatticeSC QDRII/II+ SRAM Memory Interface User's Guide, Lattice Semiconductor Corporation, Technical Note TN1096, Nov. 2007, pp. 1-19.*

Interfacing the QDR to the Xilinx Spartan-II FPGA, Cypress Semiconductor Corporation, Feb. 21, 2000, 4 pages.*

Memory Interface Solutions User Guide, Xilinx UG086 (v3.6), Sep. 21, 2010, Chapters 4 and 10, Implementing QDRII SRAM Controllers, pp. 195-224 and 395-426.*

Zain, Suhail, 72-Mbit RHQDRII+ Power Modes, Cypress Semiconductor Application Note AN69702, May 24, 2011.

SBIR/STTR, Radiation-Hardened Memory—90nm 64Mb SRAM, Award Information, Internet: http://www.sbir.gov/sbirsearch/detail/10299, retrieved Jun. 22, 2012 (Award ID 91525, Program Year 2010).

Wang, J.J. et al., Abstract for "SRAM based re-programmable FPGA for space applications", IEEE Transactions on Nuclear Science, Dec. 1999, Internet: http://ieeexplore.ieee.org/xpl/articleDetails.jsp?arnumber=819146.

Hafer, C., Abstract for "RadHard 16Mbit Monolithic SRAM for Space Applications", 2007 IEEE Aerospace Conference, Mar. 2007, Internet: http://ieeexplore.ieee.org/xpl/articleDetails.jsp?arnumber=4161512.

* cited by examiner

| NAME | TYPE | DESCRIPTION |
|---|---|---|
| RESET | Reset Input | Master Reset |
| CLK0 | Clock | Master Clock |
| CLK270 | Clock | Master Clock 270 deg shift |
| LOCKED | Enable | All input clocks stable / PLL/DCM locked |
| CAL_DONE | Enable | Calibration Complete |
| USER_NOP | NOP Enable | Force NOP cycles at QDR |
| USER_WR_N | Enable | Write Enable |
| USER_RD_N | Enable | Read Enable |
| USER_DWL | Data | Write Data - Lower Word |
| USER_DWH | Data | Write Data - Upper Word |
| USER_ADD_W | Address | Write Address |
| USER_ADD_R | Address | Read Address |
| USER_QRL | Data | Read Data - Lower Word |
| USER_QRH | Data | Read Data - Upper Word |
| USER_QRL_ERR | Status | ECC Error - Lower Word |
| USER_QRH_ERR | Status | ECC Error - Upper Word |
| USER_QR_VLD | Data Valid | Read Data is valid |
| USER_WR_FULL | Status | Internal Write Data Queue is Full |
| USER_RD_FULL | Status | Internal Read Data Queue is Full |

FIG. 3A

| NAME | TYPE (I or O) | DESCRIPTION |
|---|---|---|
| QDR_ADD | O | Address for QDR |
| QDR_W_N | O | Write Port Enable |
| QDR_D | O | Write Data to QDR |
| QDR_BW | O | Write Data Byte Enable |
| QDR_R_N | O | Read Port Enable |
| QDR_Q | I | Read Data from QDR |
| QDR_DLL_OFF | O | DLL Signal Off to QDR |
| QDR_K | O | MASTER CLK |
| QDR_KB | O | MASTER CLK (Comp) |
| QDR_CQ | I | DATA ECHO CLK |
| QDR_CQB | I | DATA ECHO CLK (Comp) |

FIG. 3B

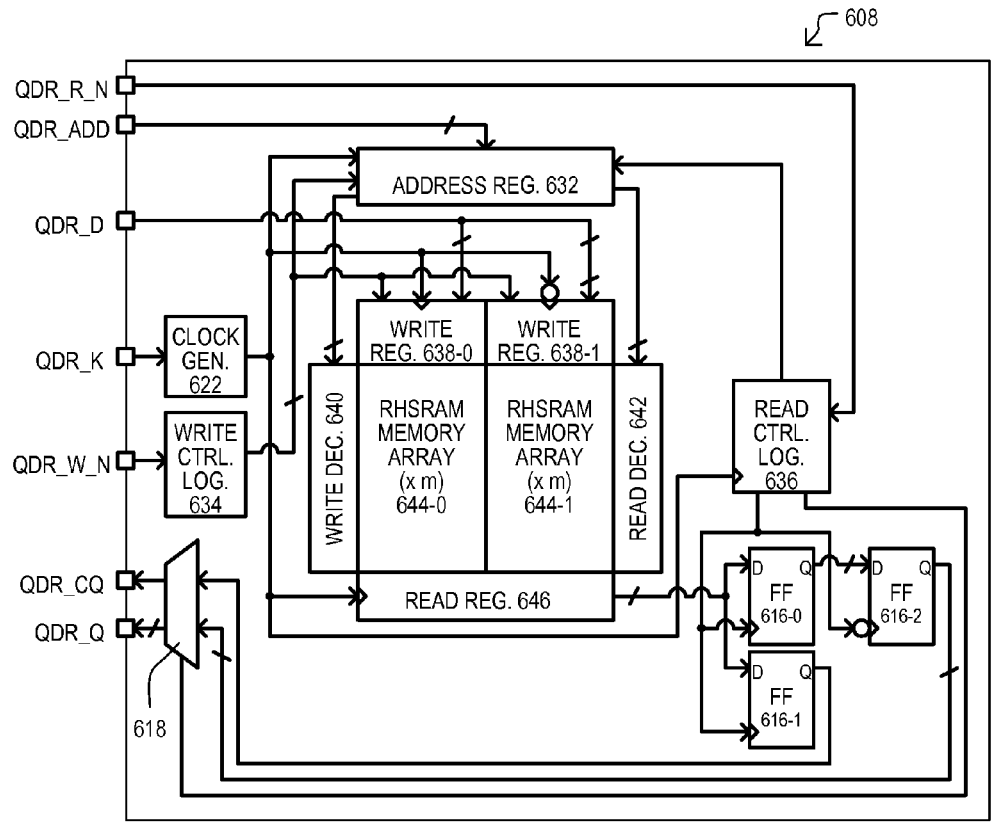
FIG. 6
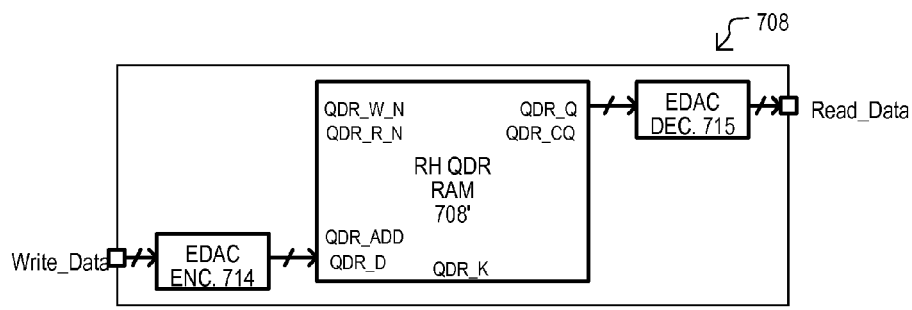
FIG. 7
| Interface Size | Data Bits | Parity Bits |
|---|---|---|
| x18 | 12 | 6 |
| x36 | 29 | 7 |
| x72 | 64 | 8 |
FIG. 8

| NAME | TYPE (I or O) | DESCRIPTION |
|---|---|---|
| CLK0 | I | MASTER CLK |
| RESET | I | RESET ALL FIFO FUNCTIONS |
| WCLK | I | CLK FOR WRITE DOMAIN |
| FIFO_W_EN_N | I | WRITE ENABLE |
| FIFO_DWL/H | I | INPUT WRITE DATA |
| FIFO_FULL_N | O | FIFO FULL INDICATION |
| FIFO_AFULL_N | O | FIFO ALMOST FULL |
| RCLK | I | CLK FOR READ DOMAIN |
| FIFO_R_EN | I | READ ENABLE |
| FIFO_QRL/H | O | OUTPUT READ DATA |
| FIFO_QRL/H_ERR | O | EDAC ERROR STATUS |
| FIFO_QR_VALID_N | O | READ DATA VALID IND. |
| FIFO_EMPTY_N | O | FIFO EMPTY INDICATION |
| FIFO_AEMPTY_N | O | FIFO ALMOST EMPTY |

FIG. 10A

| NAME | TYPE (I or O) | DESCRIPTION |
|---|---|---|
| port_w_addr | O | Address for Write Block RAM |
| port_w_en | I | Write enable - increments write address |
| port_w_clk | I | Write port clock |
| reset | I | Reset |
| full | O | FIFO full flag |
| almost_full | O | FIFO almost full flag |
| port_r_addr | O | Address for Read Block RAM |
| port_r_en | I | Read enable - increments read address |
| port_r_clk | I | Read port clock |
| qdr_wb_addr | O | Address for Write Block RAM - write data to QDR |
| qdr_wb_ren | O | Read enable for Write Block RAM |
| qdr_addr | O | Address for QDR |
| qdr_wen | O | Write enable for QDR |
| qdr_ren | O | Read enble for QDR |
| qdr_rb_addr | O | Address for Read Block RAM - read data to QDR |
| qdr_rb_wen | O | Write enable for Read Block RAM |
| empty | O | FIFO empty flag |
| almost_empty | O | FIFO almost empty flag |

FIG. 10B

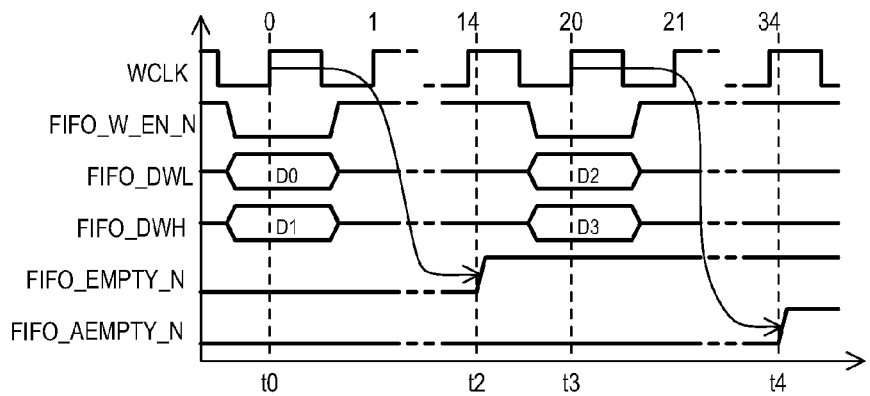
FIG. 12D
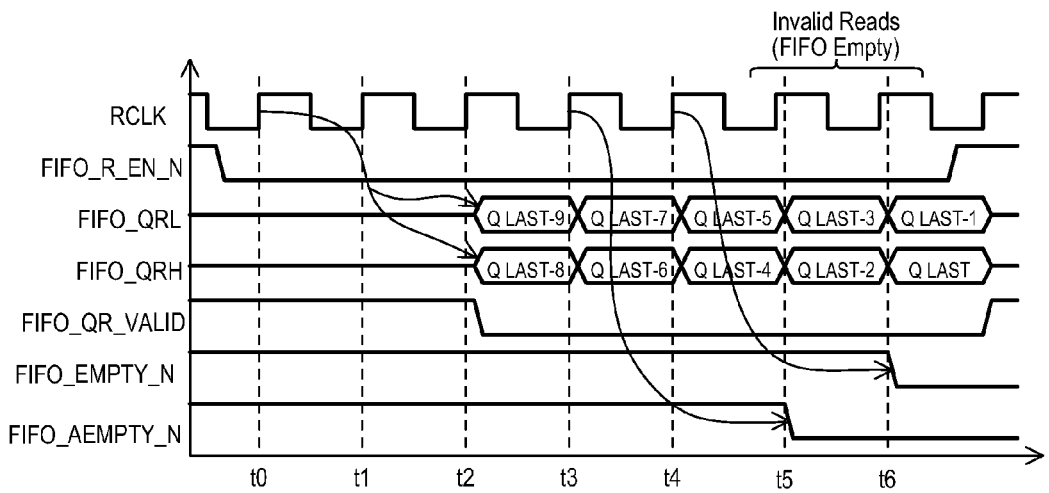
FIG. 12E
| Flag Operation | Latency (# CLK cycles) |
|---|---|
| Empty Flag assertion with Read | 0 |
| Almost Empty Flag assertion with Read | 0 |
| Empty Flag de-assertion with Write | 14 |
| Almost Empty Flag de-assertion with Write | 14 |
| Full Flag assertion with Write | 1 |
| Almost Full Flag assertion with Write | 1 |
| Full Flag de-assertion with Read | 4 |
| Almost Full Flag de-assertion with Read | 4 |
FIG. 12F

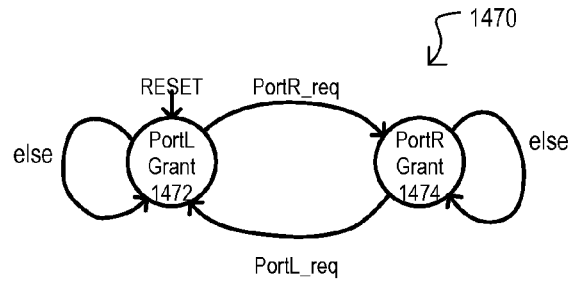

FIG. 14

| NAME | TYPE (I or O) | DESCRIPTION |
|---|---|---|
| CLK0 | I | Master Clock |
| RESET | I | Active low master reset |
| PORTL_CLK | I | Clock for left port (read & write) |
| PORTL_W_N | I | Left Port Write Enable |
| PORTL_AD_WR | I | Left Port Write Address |
| PORTL_DWL/H | I | Left Port Input Data |
| PORTL_WR_FULL | O | Left Port Read Buffer Full Flag |
| PORTL_WR_EMPTY | O | Left Port Read Buffer Empty Flag |
| PORTL_R_N | I | Left Port Read Enable |
| PORTL_AD_RD | I | Left Port Read Address |
| PORTL_QRL/H | O | Left Port Read Output Data |
| PORTL_QRL/H_ERR | O | Left Port Read Output Data error status from EDAC |
| PORTL_QR_VALID | O | Left Port Data Valid |
| PORTL_RD_FULL | O | Left Port Write Buffer Full Flag |
| PORTL_RD_EMPTY | O | Left Port Write Buffer Empty Flag |
| PORTR_CLK | I | Right Port Clock (read & write) |
| PORTR_W_N | I | Right Port Write Enable |
| PORTR_AD_WR | I | Right Port Write Address |
| PORTR_DWL/H | I | Right Port Input Data |
| PORTR_WR_FULL | O | Right Port Read Buffer Full Flag |
| PORTR_WR_EMPTY | O | Right Port Read Buffer Empty Flag |
| PORTR_R_N | I | Right Port Read Enable |
| PORTR_AD_RD | I | Right Port Read Address |
| PORTR_QRL/H | O | Right Port Read Output Data |
| PORTR_QRL/H_ERR | O | RightPort Read Output Data error status from EDAC |
| PORTR_QR_VALID | O | Right Port Data Valid |
| PORTR_RD_FULL | O | Right Port Write Buffer Full Flag |
| PORTR_RD_EMPTY | O | Right Port Write Buffer Empty Flag |

FIG. 15

(BACKGROUND)

(BACKGROUND)

(BACKGROUND)

MEMORY CONTROLLER DEVICES, SYSTEMS AND METHODS FOR TRANSLATING MEMORY REQUESTS BETWEEN FIRST AND SECOND FORMATS FOR HIGH RELIABILITY MEMORY DEVICES

TECHNICAL FIELD

The present disclosure relates generally to memory controllers, and more particularly to memory controllers for memory devices having double data rate read and/or write data buses.

BACKGROUND

Electronic systems can be employed in environments having higher reliability requirements than typical industrial applications. For example, some applications, such as systems employed in space, can require an integrated circuit be "radiation hardened" (rad hard) with respect to ionizing radiation.

Current space systems are typically designed with integrated circuited devices fabricated on technology nodes several generations behind their commercial counterparts. In the case of systems with memory devices, one conventional approach can incorporate a large number of static random access memory (SRAM) devices having speeds well below their commercial counterparts. Such SRAM devices can be used in parallel (for error correcting/redundancy), requiring a large bus and introducing wait states.

The space community is facing a huge initiative to modernize their electronic design. Conventional high reliability designs have largely been in 100 MHz (clock speed) or less domain. Currently, advances in radiation hardened field programmable gate arrays (FPGAs) have produced high reliability FPGAs operating at clock speeds of 250 MHz to 400 MHz. Conventionally, rad hard memory solutions do not match the performance of such FPGA devices.

A common memory type included in systems is a first-in-first-out (FIFO) memory. A FIFO memory can allow data to be written into and read out from its array at independent data rates. FIFOs are ubiquitous constructs needed for data manipulation tasks such as clock domain crossing and low latency memory buffering.

Monitoring the status of a FIFO memory can be an important feature to avoid any data under or over flows, and is achieved by the full and empty flags. As the name implies, a full flag is asserted when a FIFO memory is full. Similarly, an empty flag is asserted when a FIFO memory is empty. FIG. 18A is a functional block diagram of a typical conventional FIFO memory 1801. A conventional FIFO memory 1801 can include a write port 1803-0 by which data is written into the FIFO memory 1801, and a read port 1803-1 from which data is read. A write operation can be indicated by appropriate control signals at the write port 1803-0 (WENB, WCSB) and the application of input write data (Datain). Control signals and data at write port 1803-0 can be timed according to a write clock WCLK. Write data can be stored in an input register 1809, and then written into a dual port random access memory (DPRAM) array 1811. A write pointer circuit 1807 can generate a sequence of write addresses.

In a similar fashion, a read operation can be indicated by appropriate control signals at the read port 1803-1 (RENB, RCSB) timed according to a read clock RCLK. A read pointer circuit 1815 can generate a sequence of read addresses to access read data. Corresponding read data can be output from DPRAM array 1811 via driver 1821 as output read data (DATAOUT).

DPRAM array 1811 enables independent access to storage locations for input (write) and output (read) ports (1803-0/1) to operate independently. FIFO control logic 1819 can manage read and write pointers to enable first-in-first-out type accesses. Further, FIFO control logic 1819 can assert a full flag (Full) and an empty flag (Empty), if such conditions arise. In addition, FIFO control logic 1819 can assert error flags in the event a read or write access cannot be completed.

FIG. 18B shows state machine logic 1825 for a FIFO, which controls the read and write pointers along with maintaining correct flag logic. In FIG. 18B, an event "Push=1" can correspond to a write operation, while "Pop=1" can correspond to a read operation. Further, state 1827 can result in the assertion of an empty flag, while a state 1829 can result in the assertion of a full flag.

Another important set of flags sometimes implemented with FIFO memories are the almost full and almost empty flags. Such flags can be used by a system to either stop sending (PUSH) or stop receiving (POP) data to ensure data in transit can be properly handled. A value less than the maximum count for almost full and a value greater than zero for almost empty can be used to generate these flags, respectively.

Another common memory type can be a dual port memory. A dual port memory can have two totally independent ports that can have simultaneous access capability to any stored data. Each port can write and read data into and out of any memory location. FIG. 19 is a high level functional block diagram of a conventional synchronous dual port static random access memory (SRAM) 1935.

As can be seen, each port (portL 1903-0 and portR 1903-1) can have its own associated control lines (portL(R)_wr_n, portL(R)_ce_n, portL(R)_rst_n), data lines (portL(R)_io) and address lines (portL(R)_add). Operations are initiated by a low to high transition on the clock signals for each port (portL_clk, portR_clk). Writing to, or reading from, the selected address is controlled by the write/read selection signals (portL_wr_n, portR_wr_n). Output enables (portL_oe_n, portR_oe_n) are asynchronous signals and control the data flow, since inputs/outputs (I/Os) are bi-directional. Chip enables (portL_ce_n, portR_ce_n) are available for ease of depth expansion. Control circuits 1919-0/1 can control accesses for their respective ports. Addresses for different ports (portL(R)_add) can be decoded by corresponding address decoders 1937-0/1. Write data for different ports can be stored in different input registers (1907-0/1) prior to being written into DPRAM array 1911. Similarly, read data for different ports can be stored in output registers 1917-0/1, before being driven on device outputs by corresponding drivers 1921-0/1.

Data collisions between the two ports can occur and is avoided to ensure data integrity. When different data is simultaneously written to the same memory location by both ports (a collision), unknown data ends up being stored (the data can be old, new or transitional data). A similar situation exists when one port is writing data and the other port is reading data simultaneously from the same memory location. Unknown data can be read out (the data can be the old stored data or the newly written data). Arbitration is generally implemented to avoid collisions and in most cases is through customer implemented external logic to the dual port SRAM.

BRIEF DESCRIPTION OF THE DRAWINGS

FIG. 3A is a table showing controller interface connections for a system like that of FIG. 2 according to an embodiment.

FIG. 3B is a table showing memory device interface connections for a system like that of FIG. 2 according to an embodiment.

FIG. 6 is a block diagram of a memory device that can be included in the embodiments.

FIG. 7 is a block diagram of another memory device that can be included in the embodiments.

FIG. 8 is a table showing parity bits that can be implemented for different data widths in embodiments.

FIG. 10A is a table showing controller interface connections for a device like that of FIG. 9 according to an embodiment.

FIG. 10B is a timing diagram showing signals for a FIFO controller according to an embodiment

FIG. 12D is a timing diagram showing a FIFO empty flag de-assertion operation according to an embodiment.

FIG. 12E is a timing diagram showing a FIFO empty flag assertion operation according to an embodiment.

FIG. 12F is a table showing flag assertion latencies according to particular embodiments.

FIG. 14 is a state diagram of arbitration logic that can be included in embodiments.

FIG. 15 is a table showing controller interface connections for a device like that of FIG. 13 according to an embodiment.

DETAILED DESCRIPTION

Figure 1A:
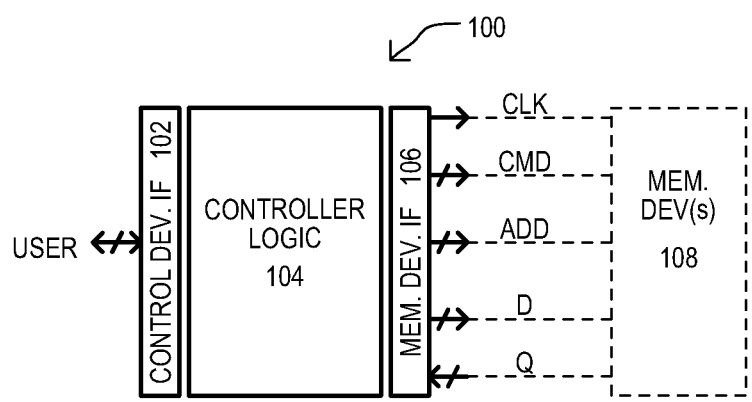
FIGS. 1A and 1B are diagrams showing a controller device and operations according to embodiments.

Various embodiments will now be described that include memory controllers and methods for high reliability (e.g., radiation hardened) memory devices and systems. Such memory controllers can enable control devices to utilize memory devices having high speed interfaces, such as double data rate (DDR) read and write buses.

In the embodiments below, like sections are referred to with the same reference character but with the leading digit(s) corresponding to the figure number.

Figure 1B:
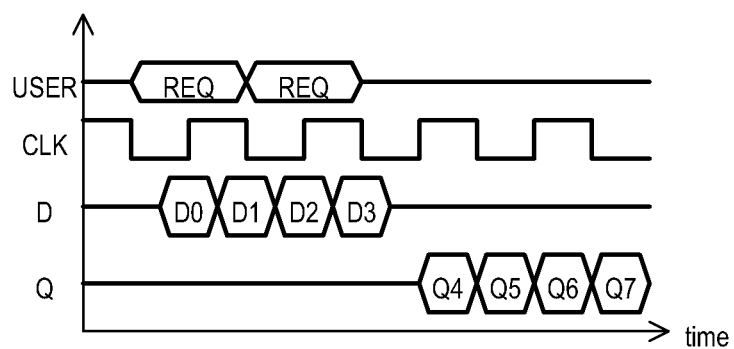

FIGS. 1A and 1B show a controller device 100 and operation according an embodiment. FIG. 1A is a block schematic diagram and FIG. 1B is a timing diagram showing signals corresponding to the controller device 100.

Referring to FIG. 1A, a controller device 100 can include a controller interface 102, controller logic 104 and a memory device interface 106. A controller device 100 can receive requests (USER) at controller interface 102 to access one or more memory devices (e.g., 108). Such requests can be in a format different from those needed to access memory device(s) 108. Controller logic 104 can translate requests at controller interface 102 to generate signals on memory device interface 106 suitable to access memory device(s) 108.

In the embodiment shown, memory device interface 106 includes a clock output CLK, a command output CMD, an address output ADD, a write data output D, and a read data input Q. A clock output CLK can output one or more periodic signals to control timing of accesses to memory device(s) 108. A command output CMD can output one or more command signals (e.g., read enable, write enable) to indicate a type of access to memory device(s) 108. In one embodiment, an address output ADD can provide address values for read and write accesses to the memory device(s) 108. In one embodiment, a write data output D can be separate from a read data output Q (i.e., the data bus is not bi-directional).

Referring to FIG. 1B, a timing diagram showing the waveforms for CLK, D and Q shown in FIG. 1A. In addition, FIG. 1B shows a waveform USER corresponding to requests received at a controller interface 102. As shown by FIG. 1B, write data (D0, D1, D2, D3) at write data output (D) can be transmitted on rising and falling edges of a clock output signal CLK. That is, write data can be output at a double data rate (DDR). In addition, read data (Q4, Q5, Q6, Q7) at read data input (Q) can be received at the same double data rate (though not necessarily phase aligned with write data). DDR read data and DDR write data can represent a "quad" data rate (QDR) access, as four data transactions can occur in a single cycle of the CLK signal.

It is understood that address and/or command signals can be transmitted according to various timing conventions, including but not limited to DDR speed and/or single data rate (SDR) speeds (i.e., one request per clock cycle).

Referring still to FIG. 1B, in the particular embodiment shown, access requests can be received at controller interface 102 at a "single" data rate (i.e., one request per clock cycle). As will be represented by various embodiments below, requests can take various forms, including but not limited to: SDR reads/writes, first-in-first-out type memory requests, or multi-port requests.

In a very particular embodiment, controller device 100 can be implemented with high reliability circuits/processes, including but not limited to, rad hard circuits/processes. In a very particular embodiment, a controller device 100 can be implemented all, or in part, with one or more rad hard field programmable gate arrays (FPGAs).

In this way, an interface can enable a QDR type memory device to be utilized with controllers having non-QDR interfaces.

Figure 2:
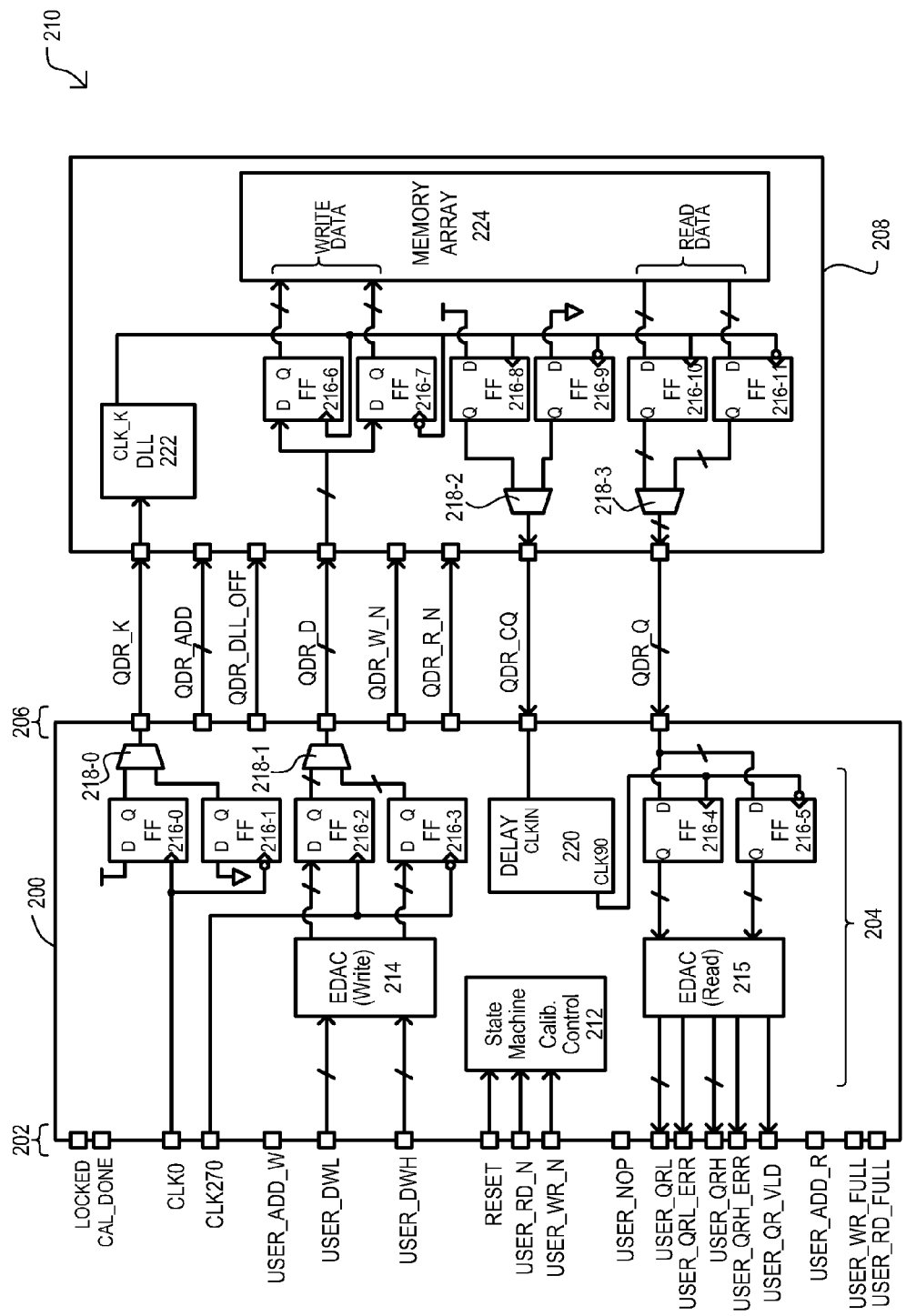
FIG. 2 is a block schematic diagram of a system according to an embodiment.

FIG. 2 shows a system 210 according to one embodiment. A system 210 can include a controller device 200 and a QDR-type memory device 208. A controller device 200 can include a controller interface 202, controller logic 204 and memory device interface 206.

A controller interface 202 can use SDR signals to make read and write requests to memory device 208. Controller logic 204 can include a control circuit 212, a write data error detection and correction (EDAC) circuit 214, a read data EDAC circuit 215, D-Q type flip-flops (FFs) 216-0 to -5, multiplexers (MUXs) 218-0/1 and a delay circuit 220.

A controller interface 202 can operate according to a SDR based protocol making read and write command requests. In particular embodiments, a controller interface 202 can include one or more buffer memories to queue read/write commands and store the corresponding address and data values. Such values can then be used to commence operations to memory device 208.

FIG. 3A is a table showing connections that can be included in a controller interface 202, according to an embodiment. FIG. 3B is a table showing connections that can be included in a memory device interface 206, according to an embodiment.

Referring still to FIG. 2, a control circuit 212 can include state machine logic that can take SDR requests received on controller interface 202, and in response, initiate read/write commands to memory device 208. SDR data can be concatenated to maintain DDR relationships with proper timings. Such state machine logic can also ensure that the read/write operations are executed concurrently for maximum performance.

FFs 216-0/1 and MUX 218-0 can generate a timing signal QDR_K for memory device 208 based on a master clock signal received at controller interface CLK0.

Write data EDAC circuit 214 can receive high and low words of write data (along with error correction bits), and perform error correction, if needed. FFs 216-2/3 and MUX 218-1 can output write data from EDAC circuit 214 according to a clock received at CLK270. This can result in write data (QDR_D) being output to memory device 208 at a double data rate.

FFs 216-4/5 can receive read data (QDR-Q) (which can include error correction bits) at a double data rate, and forward such read data to read data EDAC circuit 215 according to a timing signal generated by delay circuit 220. In the embodiment shown, delay circuit 220 can delay a read data clock signal (QDR_CQ), which can be synchronous to output read data, to generate the timing signal for FFs 216-4/5. Read data EDAC circuit 215 can receive high and low words of read data (along with error correction bits), and perform error correction, if needed. Such read data can then be output at a single data rate speed on controller read data outputs (USER_QRL/H). In the particular embodiment shown, such read data can be output with a read data valid signal (output on USER_QR_VLD), as well as error flags (USER_QRL/H_ERR) which can indicate errors in the read data.

A write data path through a controller device 200 can generate address, data and control signals required to execute write operations to memory device 208. Memory device addresses (QDR_ADD) can use DDR formatting for two-word burst operations and SDR formatting for four-word burst operations. In one embodiment, write enable signal (QDR_W_N) may use SDR formatting. In contrast, write data values (QDR_D) utilize DDR signaling to achieve the required two-word or four-word burst with their associated clock periods. Signals utilized for write operations can be center-aligned with respect to edges of master clock (QDR_K, and QDR_KB, if included).

In the particular embodiment of FIG. 2, a CLK270 signal can be used to synchronize the built-in output serializer-deserializers (SERDES) that can be used to provide appropriate alignment of write data values to a clock signal QDR_K.

A read path can be similar to the write path. Once a read address (QDR_ADD) and read enable signal (QDR_R_N) have been output to a memory device 208, read data clock signals (QDR_CQ and QDR_CQB, if included) can be used as strobes to capture DDR read data values (QDR_Q) output from memory device 208. The timing and synchronization of DDR data to SDR format can be handled by a built-in input SERDES block.

A memory device 208 can include clock generating circuit 222, D-Q FFs 216-6 to -11, MUXs 218-2/3 and memory array section 224. Clock generating circuit 222 can adjust a master clock signal QDR_K to generate an internal timing clock CLK_K. In the particular embodiment shown, clock generating circuit 222 can be a delayed lock loop (DLL) circuit. However, alternate embodiments can include phase locked loop (PLL) and similar circuits. Further, such a circuit can generate various other clock signals (e.g., QDR_CQ).

FFs 216-6/7 can receive write data (QDR-D) at a double data rate, and forward such write data to memory array section 224 according to timing signal CLK_K. According to address and write enable signals (e.g., QDR_ADD, QDR_W_N), such data can be written into memory locations of memory array section 224.

FFs 216-8/9 and MUX 218-2 can generate a read data clock QDR_CQ for controller device 200 based on an internal clock CLK_K.

In response to address and read command data (QDR_ADD, QDR_R_N), FFs 216-10/11 and MUX 218-3 can receive read data from memory array section 224, and output such data as DDR read data (QDR_Q) for controller device 200.

Memory array section 224 can include memory cell arrays, address decoders, control circuits, etc. to enable access to storage locations. In some embodiments, memory array section 224 can include high reliability memory cells.

Figure 3C:
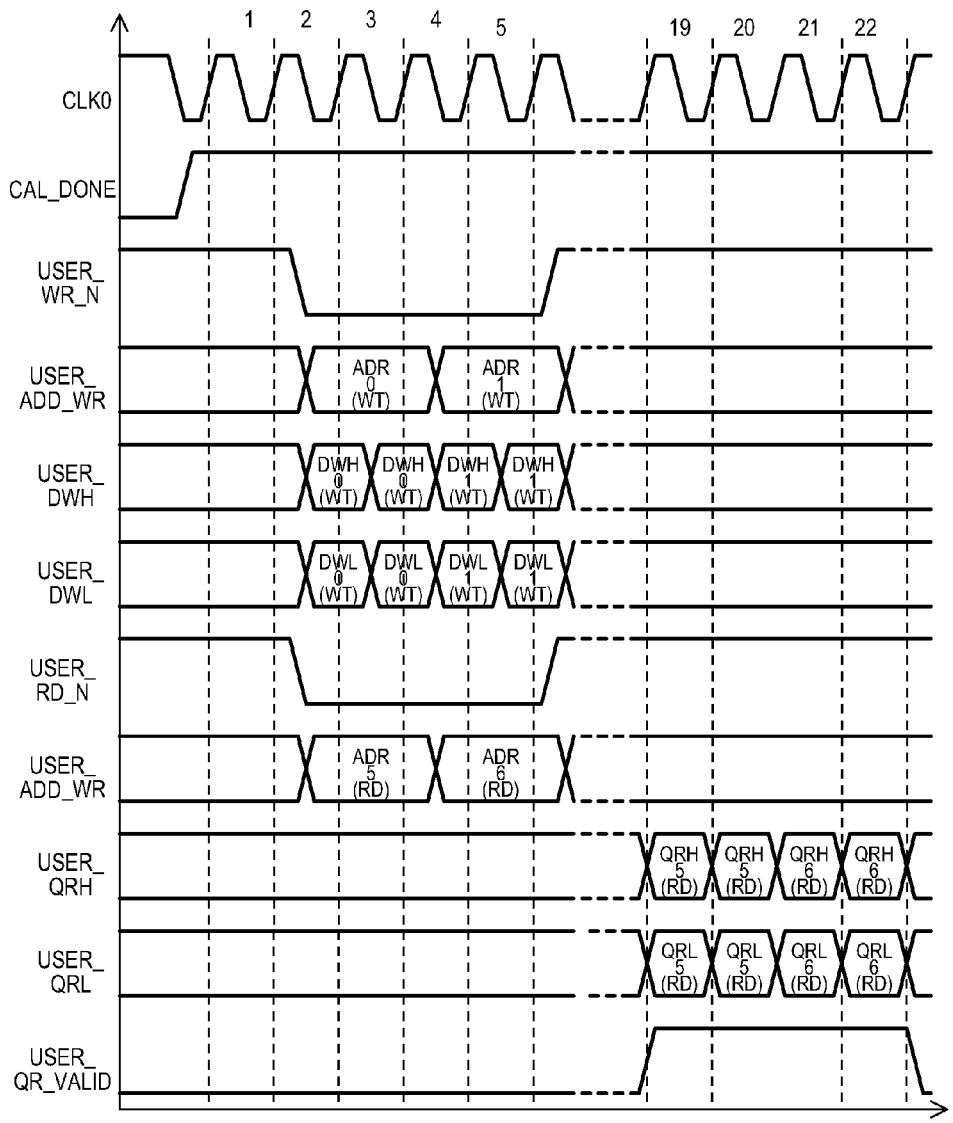
FIG. 3C is a timing diagram showing operations at a controller interface for a system like that of FIG. 2, according to an embodiment.

FIG. 3C is a timing diagram showing accesses at controller interface 202 of FIG. 2, according to one embodiment. As shown, accesses to a memory device (e.g., 208) should not proceed until delay calibration is complete (i.e., CAL_DONE goes high).

Referring now to FIG. 3C, write requests according to an embodiment will be described. Write requests can be made by issuing an active-low on USER_WR_N during the rising edge of CLK0. A corresponding write address (USER_ADD_WR) is presented on the same rising edge of CLK0. Two data words to be written to a memory device (e.g., 208) can be presented at write data inputs USER_DWH, USER_DWL. For a burst of four data words, the third and fourth words are presented to the write data inputs (USER_DWH, USER_DWL) on the next rising edge of CLK0.

Referring still to FIG. 3C, read requests according to an embodiment will be described. Read requests can be made by issuing an active low on USER_RD_N during a rising edge of CLK0. A read address is also presented at a read address input (USER_ADD_RD) on the same CLK0 clock edge. Following a read latency, corresponding read data words are presented on USER_QRL and USER_QRH data outputs. FIG. 3C shows the timing details for a four-word burst configuration.

As understood from FIG. 3C, read and write data are synchronous with signal CLK0. That is, write data (DWH0/1, DWL0/1) can be presented in synchronism with CLK0 (in this case a rising edge of CLK0) and read data can be output synchronous with CLK0 (though not aligned with any edge of CLK0 in this case).

Figure 3D:
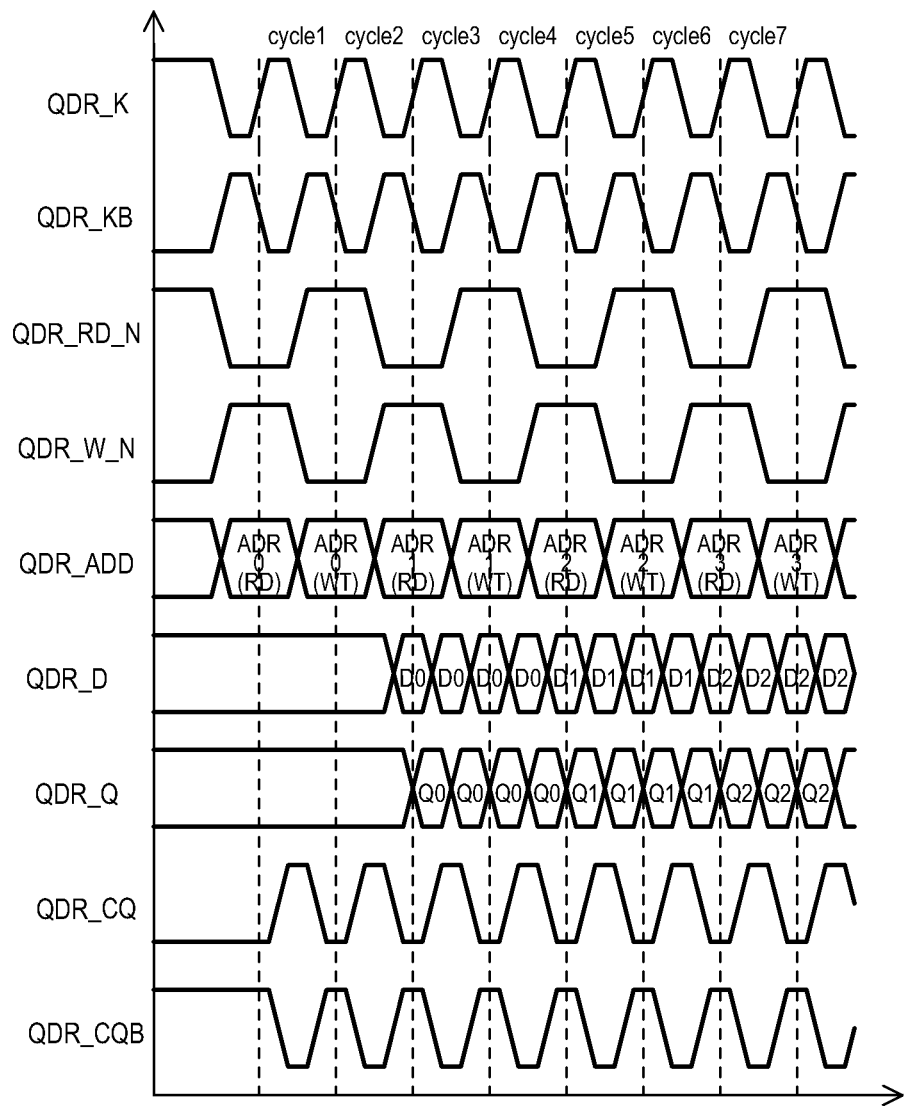
FIG. 3D is a timing diagram showing operations at a memory device interface for a system like that of FIG. 2, according to an embodiment.

FIG. 3D is a timing diagram showing access signals at a memory device interface 206 of FIG. 2, according to one embodiment.

FIG. 3D shows timing waveforms for 4-word burst operations. As can be seen, an address output (QDR_ADD) is shared between the read and write commands. A read address along with a read enable (QDR_RD_N, active low) is presented on clock cycle 1, whereas a write address along with a write enable (QDR_W_N, active low) is presented on clock cycle 2. FIG. 3D shows operations with a read latency of 2 clock cycles. Thus, read data values can be received from a memory device (e.g., 208) at read data input (QDR_Q) on clock cycle 3. In the embodiment shown, read data are edge aligned with read clock signals (QDR_CQ, QDR_CQB). Read clock signals (QDR_CQ, QDR_CQB) are synchronous with clock signal QDR_K.

FIG. 3D also shows an operation with a write latency of 1 clock cycle. Thus, write data in values can be transmitted on write data output (QDR_D) to a memory device (e.g., 208) on clock cycle 3. In the embodiment shown, write data are aligned with a rising edge of clock signal QDR_K.

It is understood that a 2-word burst operation can be similar to the 4-word burst operation shown, except that an address bus can also operate at a double data rate, with read and write addresses being presented on different edges of the same clock cycle.

Referring back to FIG. 2, in one very particular embodiment, a controller device 200 can be implemented on a Virtex-5QV FPGA manufactured by Xilinx of San Jose, Calif., by configuring the device with configuration data. Such an FPGA can include built-in SDR to DDR and DDR to SDR conversion registers that provide signals according to an appropriate input/output (I/O) standard (e.g., high speed transceiver logic (HSTL) HSTL-15). Such an FPGA can also include block RAM memories to queue the read/write commands and store the corresponding address and data values, as well as built in input SERDES (ISERDES) and output SERDES (OSERDES).

Figure 4:
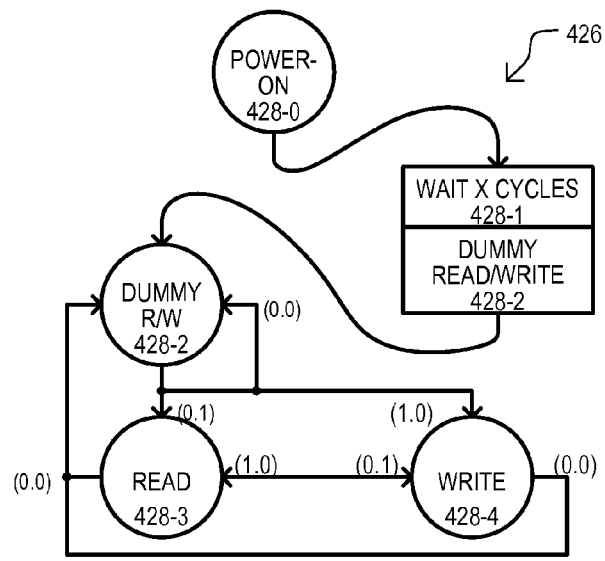
FIG. 4 is a diagram of state machine logic that can be included in a control device according to an embodiment.

FIG. 4 shows one example of a read/write state machine that can be included in embodiments. A state machine 426 can be included in a control circuit of a controller device, such as that shown as 212 in FIG. 2. A state machine 426 can coordinate a flow of data through a controller device (e.g., 200) to/from memory device (e.g., 208). Upon receiving requests at a controller interface (e.g., 202), a state machine 426 can drive signals to initiate read/write commands to a memory device (e.g., 208). A state machine 426 can continually monitor for any pending read or write commands. In the embodiment shown, it is assumed that a memory device (e.g., 208) can enter a low power mode (e.g., standby), thus during idle periods, dummy read and write commands can be initiated to keep the memory device (e.g., 208) in a correct power mode (Active).

As noted above, in some embodiments, a state machine 426 can ensure that read/write operations are performed concurrently for maximum bandwidth.

FIG. 4 shows a state machine for 2-word burst operations. In the embodiment shown, states are shown as (x.y), where x is a write command, y is a read command, and 1 indicates an active command, while 0 indicates no active command.

Upon predetermined conditions (e.g., power-on or reset) 428-0 a state machine can issue dummy read and write commands for a predetermined number of cycles 428-1/2. Dummy read and write commands can continue to be issued (428-2) until a read or write command is active. Upon receiving an active read command (0.1), state machine 426 can proceed to a read state 428-3, and generate output signals to a memory device to execute a read operation. Upon receiving an active write command (1.0), state machine 426 can proceed to a write state 428-4, and generate output signals to a memory device to execute a write operation. From read or write states (428-3/4), state machine 426 can proceed between dummy, read and write states according to received commands, or the absence of such commands.

Figure 5:
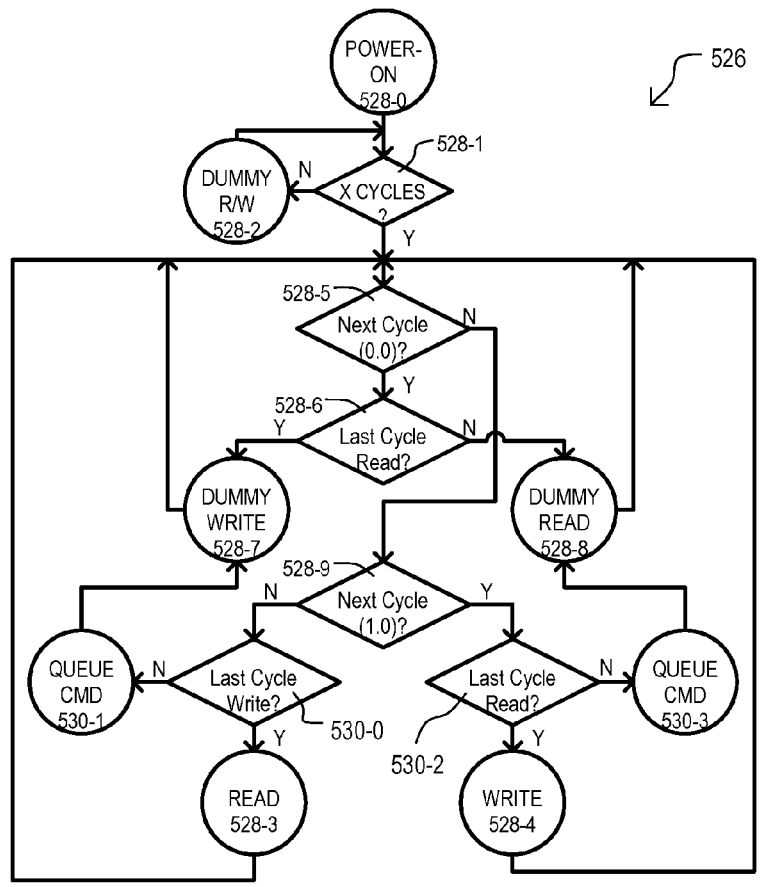
FIG. 5 is a diagram of state machine logic that can be included in a control device according to an embodiment.

FIG. 5 shows a state machine 526 for 4-word burst operations that can be included in a controller of an embodiment as described herein. State machine 526 can be similar to that of FIG. 4, but will not allow two consecutive writes or two consecutive reads.

Upon predetermined conditions (e.g., power-on or reset) 528-0 a state machine can issue dummy read and write commands 528-2 if a predetermined number (X) of cycles has not passed (N from 528-1). After the predetermined number of cycles has passed (Y from 528-1), a state machine 526 can check if operations are idle (i.e., no read or write commands received at a controller interface, shown in 528-5, with (0.0) indicating no active write command or active read command, as in FIG. 4).

If operations are idle (Y from 528-5), a state machine 526 can execute a dummy operation opposite to that previously executed (528-6, 528-7, 528-8).

If operations are not idle (N from 528-5), a state machine 526 determines a next operation type (i.e., read or write, shown in 528-9, with (1.0) indicating an active write command and no active read command). State machine 526 can then execute a read operation (528-3), if the previous operation was a write operation (Y from 530-0), or queue the read operation (530-1) if the previous operation was not a write operation (N from 530-0). Similarly, a state machine 526 can execute a write operation (528-4), if the previous operation was a read operation (Y from 530-2), or queue the write operation (530-3) if the previous operation was not a read operation (N from 530-2).

In a particular embodiment, an active signal at a RESET input can bring a state machine (e.g., 426/526) to the dummy R/W state (428-2, 528-2) by resetting all the registers.

FIG. 6 shows a memory device 608 that can be included in embodiments. A memory device 608 can be a radiation hardened quad data rate static random access memory (SRAM) device. A memory device 608 can include an address register 632, a clock generator 622, write control logic 634, read control logic 636, write registers 638-0/1, write decoder 640, read decoder 642, radiation hardened SRAM (RHSRAM) arrays 644-0/1, read register 646, and FFs 616-0 to -2. RHSRAM arrays 644-0/1 can have a "x m" data width (i.e., data storage locations are accessed in groups of m bits).

Address register 632 can capture addresses issued from a controller device (on QDR_ADD) at an SDR rate or DDR rate with respect to QDR_K. Write data (on QDR_D) can be received at a DDR rate with respect to QDR_K. Read data can be output on QDR_Q at a DDR rate with respect to QDR_K.

In one very particular embodiment, a memory device 608 can be a radiation hardened QDRII+® SRAM memory manufactured by Cypress Semiconductor Corporation of San Jose, Calif.

While FIG. 2 shows a system in which EDAC circuits can be included within a controller device 200, in other embodiments EDAC circuits can be included as part of a memory device. FIG. 7 shows an example of another memory device 708. Memory device 708 can include a QDR memory device 708', a write EDAC circuit 714 and a read EDAC circuit 715.

A QDR memory device 708' can be one like that shown in FIG. 6, including RHSRAM arrays that provide high reliability. Some RHSRAM devices can guarantee only single bit upsets in every word including bursts due to proprietary architectural implementation. To provide even greater error protection, write EDAC circuit 714 can be included at a write data input (QDR_D) of the QDR memory device 708'. Similarly, read EDAC circuit 715 can be provided at a read data output (QDR-Q) of QDR memory device 708'. EDAC circuits (714/715) can be any suitable EDAC circuit for a desired reliability.

An important EDAC parameter can be the Minimum Hamming Distance (MD). MD determines the random error detecting and random error correcting capabilities of EDAC. The greater the distance, the less likely an error will be made in the decoding process. In some embodiments, a Hamming distance of at least 4 is required for single error correction and double error detection. FIG. 8 is a table listing parity bits implemented for different data width examples.

Figure 9:
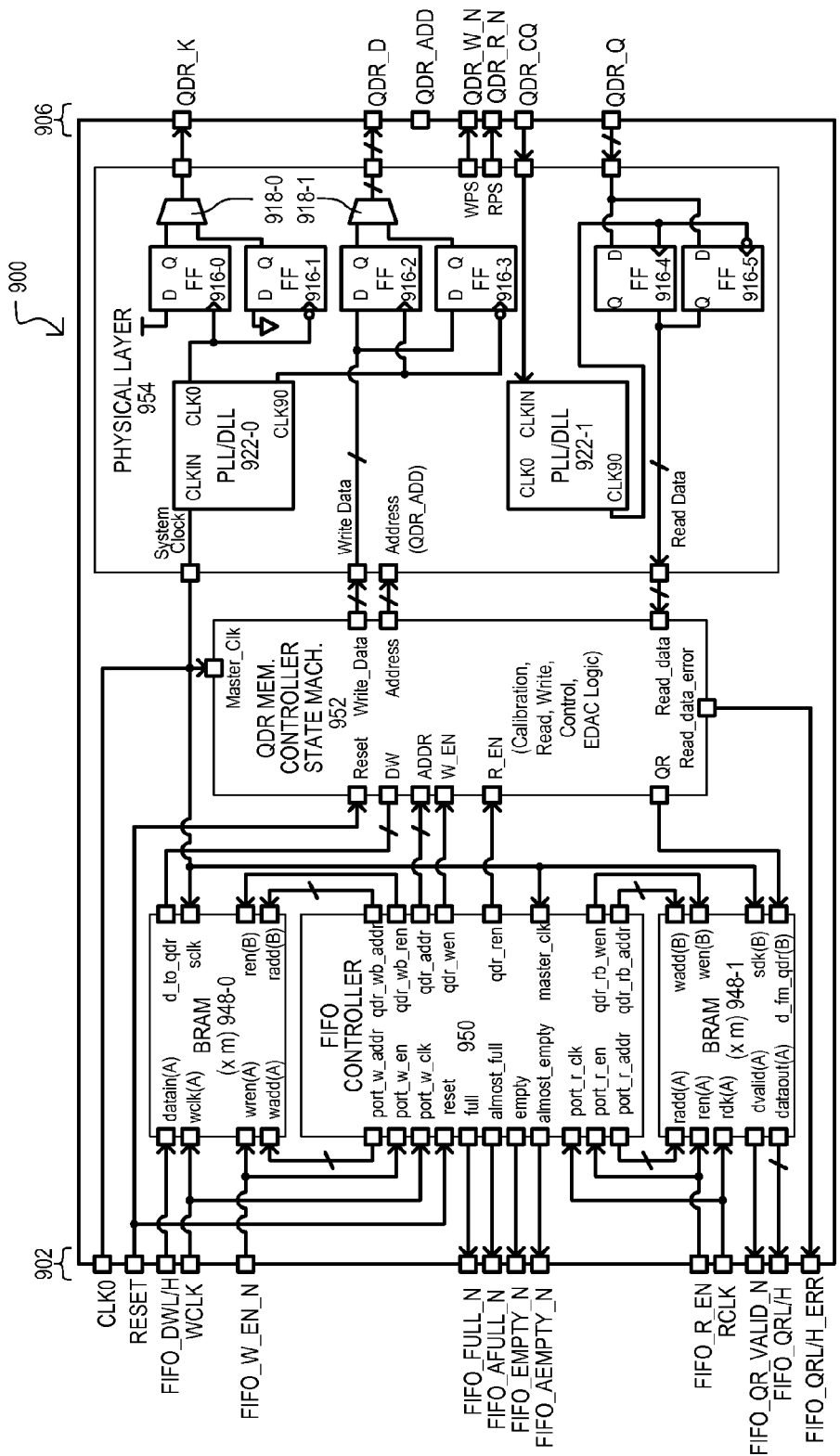
FIG. 9 is a block schematic diagram of a first-in-first-out (FIFO) memory controller device according to an embodiment.

While FIG. 2 shows a controller device 200 having one particular controller interface 202, as noted previously, alternate embodiments can include interfaces to enable different memory configurations. One such embodiment can utilize a controller device to enable first-in-first-out (FIFO) memory operations with QDR type memory devices, as described herein, or equivalents. FIG. 9 shows FIFO type implementation according to one particular embodiment.

Figure 18A:
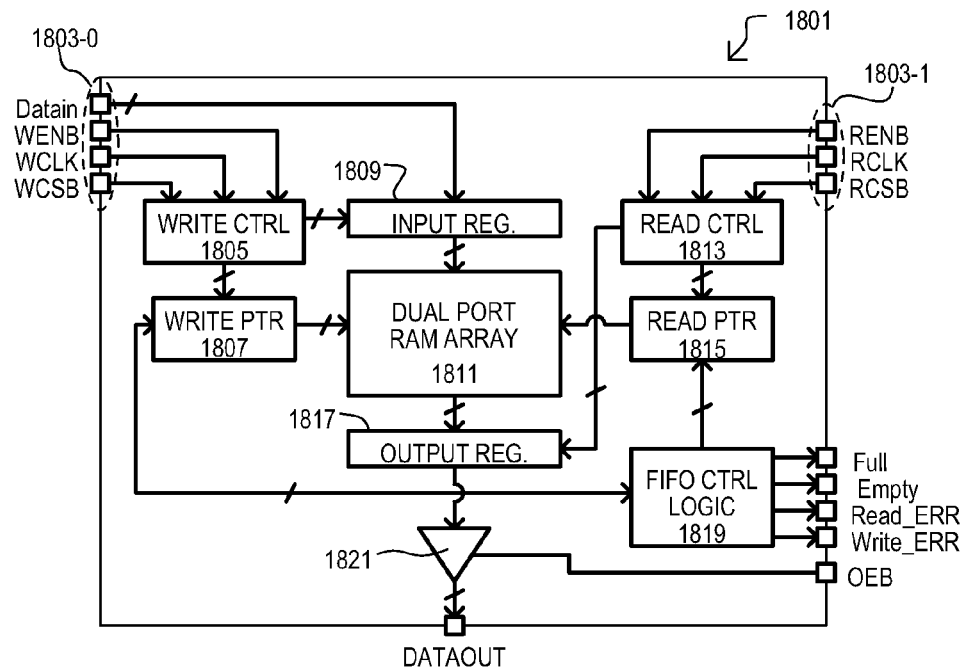
FIG. 18A is a diagram showing a conventional first-in-first-out (FIFO) memory.
Figure 18B:
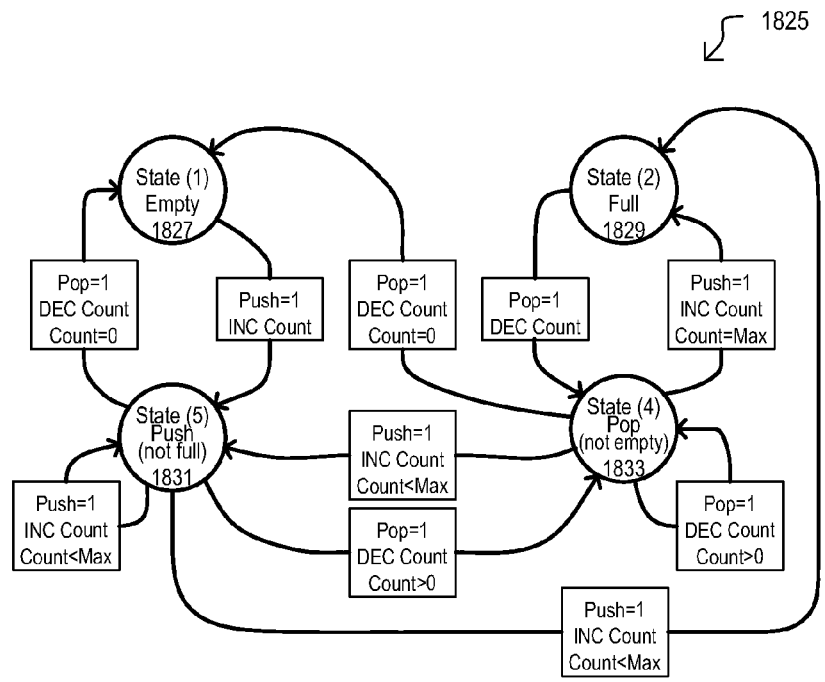
FIG. 18B shows state machine logic for the FIFO of FIG. 18A.

FIG. 9 shows a controller device 900 that can be included to replace a dual port RAM array (like that shown in FIG. 18A) with a single port QDR type memory device. Such a QDR type memory device can have a read data output separate from a write data input, both employing DDR architectures.

A controller device 900 can include a first buffer memory (write buffer or block RAM) 948-0, a second buffer memory (read buffer or block RAM) 948-1, a FIFO controller 950, a QDR memory controller 952, and a physical layer section 954.

A physical layer section 954 can transmit and receive signals from a QDR type memory device (not shown). A physical layer section 954 can write data to the memory device, read data from the memory device, provide control signals to operate the memory device, and transfer read and write data clocks from a clock domain of the memory device to the clock domain of the controller device 900.

In the particular embodiment shown, physical layer section 954 can include clock generating circuits 922-0/1, FFs 916-0 to -5, and MUXs 918-0/1. FFs (916-0 to -5) can ensure that data can be sent to, and received from, a memory device on both edges of a clock (QDR_K for write data, QDR_CQ for read data). Clock generating circuits (922-0/1) which can be PLLs or DLLs, can center-align write data to a write data clock (QDR_K) and align a read data clock (QDR_CQ) to read data, to ensure an optimum data valid window capture.

A QDR memory controller 952 can provide an interface between a FIFO controller 950 and physical layer section 954. One main function of QDR memory controller 952 can be to ensure that data and timing are aligned according to the specification of the corresponding memory device(s). In particular, QDR memory controller 952 can receive read and write requests from controller interface 902, and translate them into QDR memory device access signals, including DDR data rates. A QDR memory controller 952 can also include EDAC circuits, as described herein or equivalents, to perform error detection and/or correction on read or write data transferred through the QDR memory controller 952. In one very particular embodiment, a QDR memory controller 952 can provide single error correction and double error detection (SECDED).

A QDR memory controller 952 can also implement synchronization and training sequences to optimize signal transfer conditions. Other functions can include generating phased clocks, and data path sequencing.

A FIFO controller 950 can implement FIFO functionality for the controller device 900. A FIFO controller 950 can include a controller interface 902 for synchronous read and write operations.

In the embodiment shown, a FIFO controller 950 can operate in conjunction with first buffer memory 948-0, which can operate as a write buffer, and a second buffer memory 948-1, which can operate as a read buffer RAM. According to FIFO controller 950, data flow can be automatic and controlled by read and write counters in conjunction with a full flag (full) and an empty flag (empty). In the embodiment shown, FIFO controller 950 can also provide an almost full flag (almost_full) and an almost empty flag (almost_empty) for early warnings to a controlling device.

FIG. 10A is a table showing connections that can be included in a controller interface 902, according to an embodiment. FIG. 10B is a table showing signals provided and received by FIFO controller 950, according to an embodiment.

To implement separate FIFO read and write ports, a controller device 900 includes the write and read buffer RAMs 948-0/1. In a write buffer RAM 948-0 operation, as soon as write data is available, a write command (WEN) can be issued to the QDR memory controller 952, with a write address and write data from the write buffer RAM 948-0. Value "port_w_addr", which is an address pointer, can be incremented with each write cycle (i.e., FIFO write), and the corresponding pointer "qdr_wb_addr" is used to read data from write buffer RAM 948-0 to the QDR memory controller 952, which subsequently writes it to the memory device (not shown) via QDR_D, QDR_ADD, QDR_W_N.

To reduce latency in a FIFO read operation, FIFO controller 950 can maintain a copy of the data in the write buffer RAM 948-0 in the read buffer RAM 948-1. As long as a read buffer RAM 948-1 has storage space, data written into the write buffer RAM 948-0 can be mirrored into the read buffer RAM 948-1. Once the read buffer RAM 948-1 gets full, every following read command (POP) will result in the FIFO controller initiating a read command to the QDR memory controller 952 to readout data from the QDR memory device. A value "port_r_addr" is an address pointer that is incremented on each read cycle and the corresponding address "qdr_r-b_addr" is used to write data from the QDR memory device to the read buffer RAM 948-1. The values "port_r_addr" and "qdr_rb_addr" can work in a round robin fashion.

In one very particular embodiment, a controller device 900 can be implemented on a Virtex-5QV FPGA manufactured by Xilinx of San Jose, Calif., by configuring the device with configuration data. Components of a physical layer section 954 can be built into the FPGA architecture.

Figure 11A:
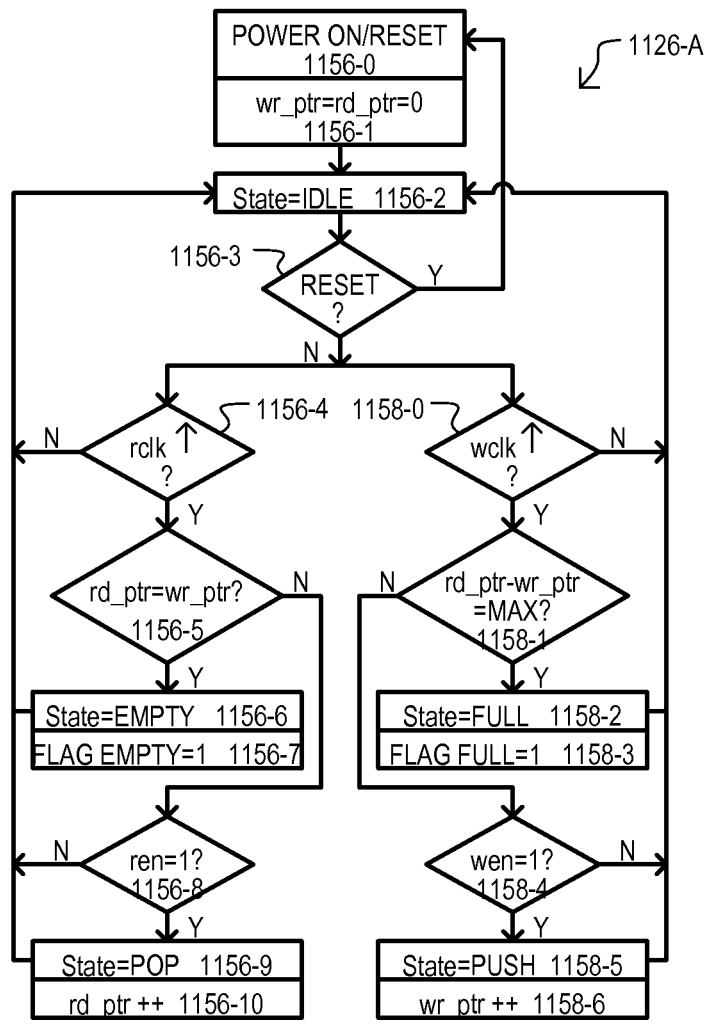
FIGS. 11A and 11B are state diagrams showing logic of a FIFO controller according to embodiments.

FIG. 11A is a flow diagram of a state machine 1126-A that can be included in a FIFO controller like that shown as 950 in FIG. 9. A state machine 1126 can properly transfer data between the read and write buffer RAMs (948-0/1) and a QDR memory device to maintain the dual port functionality.

In FIG. 11A, a read pointer (rd_ptr) and write pointer (wr_ptr) are used as addresses and work in a round robin fashion. In the particular embodiment shown, only FULL and EMPTY flags are implemented. MAX refers to the maximum allowable address space.

Referring to FIG. 11A, in response to a predetermined condition (i.e., power-on or reset) 1156-0, read and write pointers can be set to an initial value 1156-1 (zero in this case). A device can then enter an idle state 1156-2. In response to a RESET state (Y from 1156-3), read/write pointer can be initialized again (return to 1156-0/1).

In the absence of a RESET state (N from 1156-3), state machine 1126-A can check for a read clock transition 1156-4 or a write clock transition 1158-0. If no read clock transition occurs (N from 1156-4) or no write clock transition occurs (N from 1158-0), a state machine can return to an idle state 1156-2.

If a read clock transition occurs (Y from 1156-4), a state machine can check to see if a read pointer is the same as a write pointer (1156-5). If such a state exists (Y from 1156-5), a FIFO device state can be considered empty (1156-6), and an empty flag can be asserted (1156-7). If a read pointer is not the same as a write pointer (N from 1156-5), a state machine can check to see if a read enable signal is asserted (1156-8), indicating a read operation. If a read enable is not asserted (N from 1156-8), a device can return to an idle state (1156-2). If a read enable is asserted (Y from 1156-8), a FIFO state can be set to "POP" (1156-9), which can initiate a read operation using the read pointer value. A read pointer can be incremented (1156-10), and a state machine can return to an idle state (1156-2).

If a write clock transition occurs (Y from 1158-0), a state machine can check to see if a difference between a read pointer and a write pointer has reached a maximum value (1158-1). If such a state exists (Y from 1158-1), a FIFO device state can be considered full (1158-2), and a full flag can be asserted (1158-3). If a maximum difference between a read pointer and write pointer has not been reached (N from 1158-1), a state machine can check to see if a write enable signal is asserted (1158-4), indicating a write operation. If a write enable is not asserted (N from 1158-4), a device can return to an idle state (1156-2). If a write enable is asserted (Y from 1158-4), a FIFO state can be set to "PUSH" (1158-5) which can initiate a write operation using the write pointer value. A write pointer can be incremented (1158-6), and a state machine can return to an idle state (1156-2).

Figure 11B:
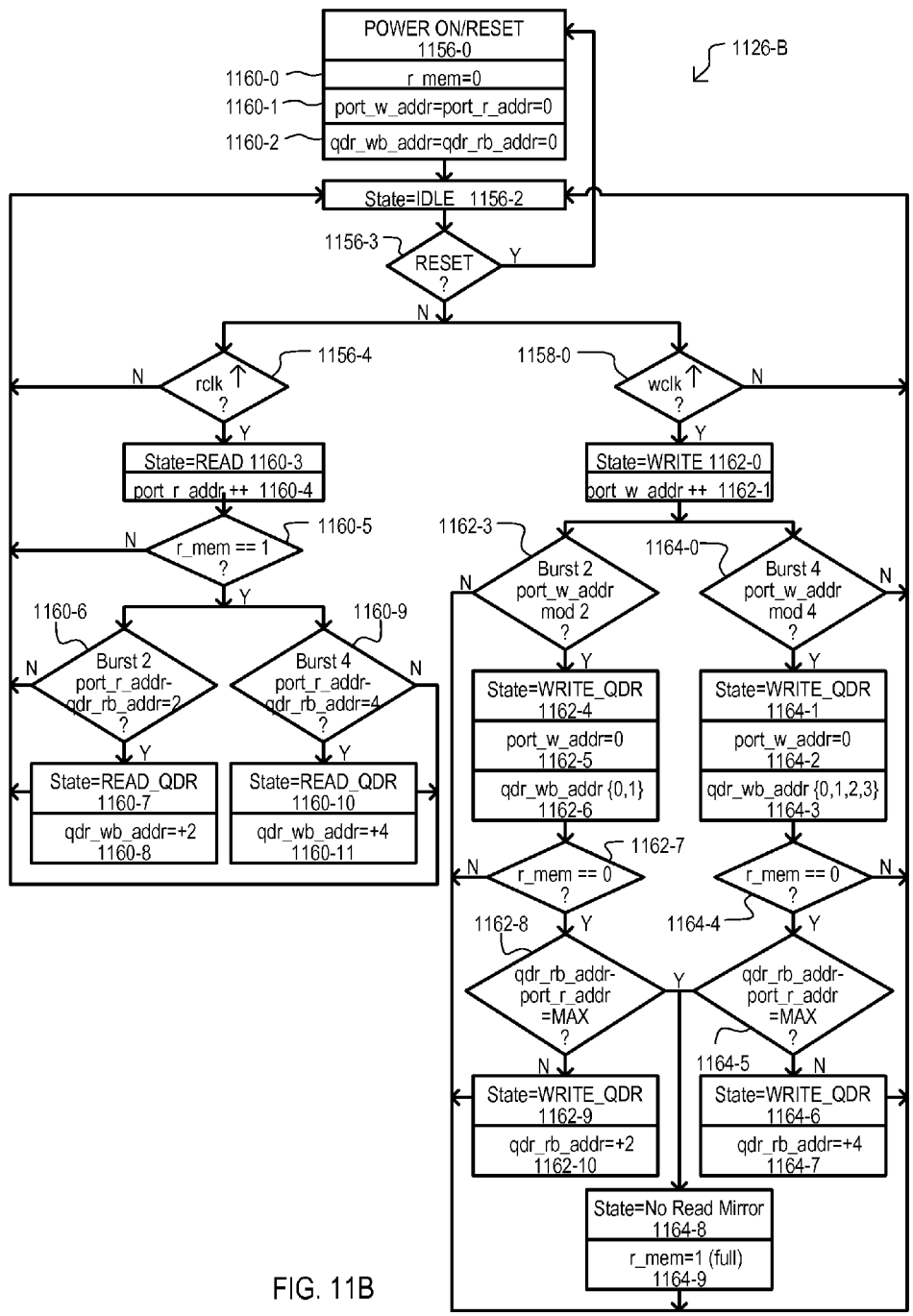

FIG. 11B is a flow diagram of a state machine 1126-B like that of FIG. 11B, but for operations that accommodate burst accesses.

Referring to FIG. 11B, in response to a predetermined condition (i.e., power-on or reset) 1156-0, a full flag for a read block RAM (e.g., 948-1) can be reset (r_mem=0) 1160-0. Read and write addresses to the read/write block RAMs can be set to initial values 1160-1/2. A device can then enter an idle state 1156-2. In response to a RESET state (Y from 1156-3), block RAM addresses can be initialized again (return to 1156-0).

In the absence of a RESET state, state machine 1126-B can check for read/write clock transitions as in the case of FIG. 11A (1156-4, 1158-0), and return to an idle state 1156-2 in the absence of such clock transitions.

If a read clock transition occurs (Y from 1156-4), a state machine can enter a read state 1160-3. A read address can then be incremented 1160-4, to point to a next read location. A state machine 1126-B can then check to see if the read block RAM is full 1160-5. If the read block RAM is not full (N from 1160-5), a state machine can return to an idle state.

If the read block RAM is full (Y from 1160-5), a state machine can determine if a two or four word burst operation is taking place (1160-6/9). A read operation can be made to a QDR memory device corresponding to the burst (1160-7/10), and the read address for the write block RAM can be incremented accordingly (1160-8/11).

If a write transition occurs (Y from 1158-0), a state machine can enter a write state 1162-0. A write address can then be incremented 1162-1, to point to a write read location.

A state machine can determine if a two or four word burst operation is taking place (1162-3/1164-0). A write operation can be made to a QDR memory device by reading an appropriate amount of data from the write block RAM (1162-4/5/6, 1164-1/2/3).

A state machine can then check to see if a read block RAM full flag is set (1162-7, 1164-4). If the flag is not set (N from 1162-7, 1164-4), write data is not replicated in the read block RAM and a state machine can return to the idle state 1156-2.

If the read block RAM full flag is set (Y from 1162-7, 1164-4), a state machine can determine if a write operation will result in the read block RAM being full (1162-8/1164-5). If the read block RAM will be full (Y from 1162-8/1164-5), a state machine can enter a no read mirror state (1164-8), in which data in a write block RAM will no longer be replicated in a read block RAM. A read block RAM full flag can also be set 1164-9.

If there is room in a read block RAM (N from 1162-8, 1164-5), a state machine can write the incoming write data to a QDR (1162-9/1164-6), and a write address for the read block RAM can be incremented accordingly (1162-10/1164-7).

A controller device like that of FIG. 9 can provide for a deep and high speed FIFO memory device. High density can be achieved by utilizing a high capacity QDR memory device (e.g., 72 Mbit or greater). Wide bit configurations can be achieved (e.g., ×18 or ×36 configurations). High speed operations can be achieved (250 MHz), as read and write accesses can match clock speeds of the controller device. In some embodiments, EDAC capabilities can be built into the device.

Having described a controller device according to one embodiment in FIG. 9, various operations of such a device will now be described with reference to timing diagrams.

Figure 12A:
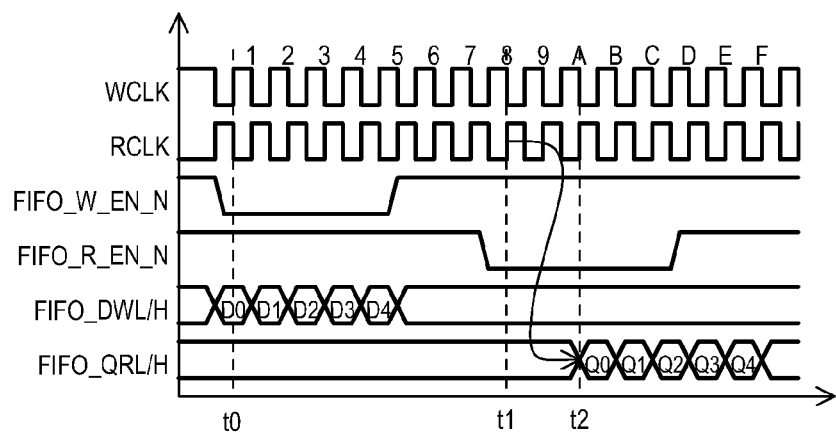
FIG. 12A is a timing diagram showing FIFO read and write operations according to embodiments.

FIG. 12A is a timing diagram showing FIFO read and write operations according to embodiments. Write clock WCLK can be phase shifted with respect to a read clock RCLK by 180°. A write enable signal (FIFO_W_EN_N) can be asserted prior to time t0, to indicate write operations. Starting at time t0, on consecutive rising transitions of WCLK, write data (D0, D1, D2, D3, D4) can be written into the FIFO device.

A read enable signal (FIFO_R_EN_N) can be asserted prior to time t1, to indicate read operations. Starting at time t1, on consecutive rising transitions of RCLK, read accesses can be initiated. In the particular embodiment shown, a read latency can be two cycles, thus read data (Q0, Q1, Q2, Q3, Q4) can start to be output at time t2.

Figure 12B:
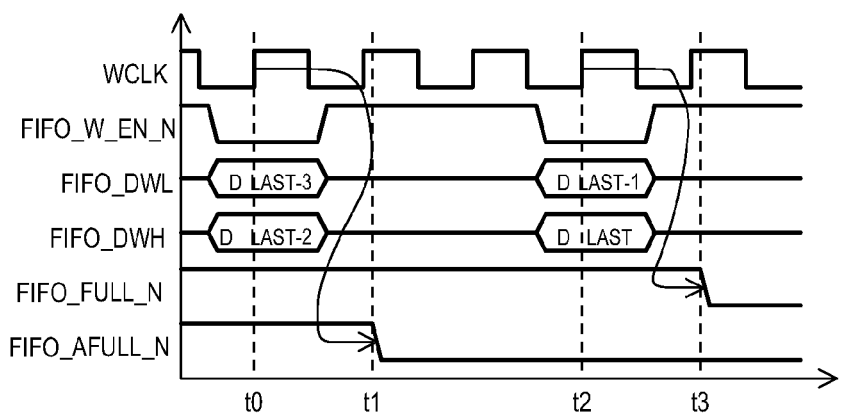
FIG. 12B is a timing diagram showing a FIFO full flag assertion operation according to an embodiment.

FIG. 12B is a timing diagram showing a FIFO full flag assertion operation according to an embodiment. In the particular embodiment shown, it is assumed that an "almost full"

flag is asserted when less than four data write locations are available. Further, almost full and full flags are asserted low.

At about time t0, write operations can write data to fourth-to-last (D LAST-3) and third-to-last (D LAST-2) available locations. In response, at time t1, an almost full flag (FIFO_AFULL_N) can be asserted low.

It is assumed that no read operations occur between times t0 and t2.

At about time t2, write operations can write data to second-to-last (D LAST-1) and last (D LAST) available locations, filling the FIFO. In response, at time t3, a full flag (FIFO_FULL_N) can be asserted low.

Figure 12C:
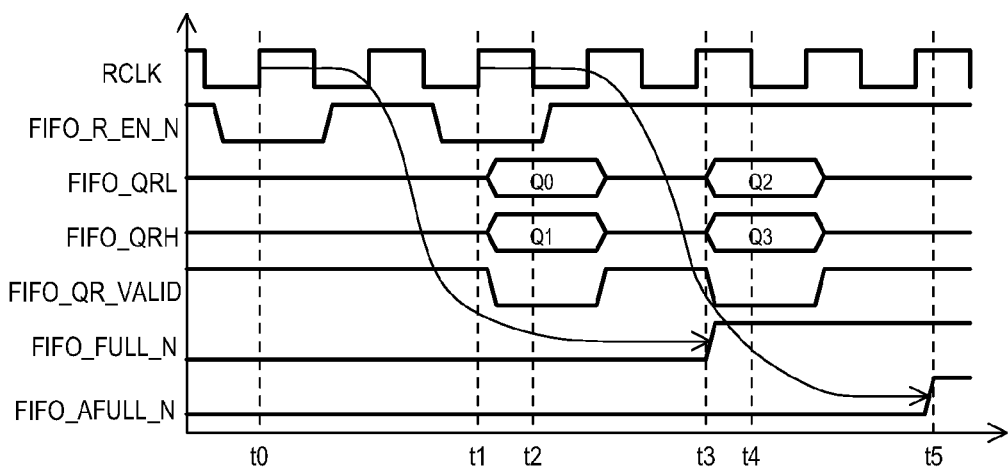
FIG. 12C is a timing diagram showing a FIFO full flag de-assertion operation according to an embodiment.

FIG. 12C is a timing diagram showing a FIFO full flag de-assertion operation according to an embodiment. In the particular embodiment shown, a FIFO operation corresponds to that of FIG. 12B, asserting an "almost full" flag when less than four data write locations are available. Further, it is assumed that prior to time t0, the FIFO is full.

At about time t0, a read operation can read two data values (Q0, Q1). Such data values can be valid at time t2. Further, the read operation frees two storage locations, thus the FIFO is no longer full. Consequently, the full flag (FIFO_FULL_N) can be de-asserted high at time t3.

It is assumed that no write operations occur between times t0 and t1.

At about time t1, a second read operation can read two more data values (Q2, Q3). Such data values can be valid at time t4. Further, the read operation frees two storage locations, thus four FIFO locations can be available. Consequently, the almost full flag (FIFO_AFULL_N) can be de-asserted high at time t5.

FIG. 12D is a timing diagram showing a FIFO empty flag de-assertion operation according to an embodiment. In the particular embodiment shown, it is assumed that an "almost empty" flag is asserted when less than four data write locations are filled. Further, almost empty and empty flags are asserted low.

In FIG. 12D it is assumed that a FIFO is empty prior to time t0.

At about time t0 (cycle 0), a write operation can write data two data values (D0, D1) into the empty FIFO. In the embodiment shown, a latency for an almost full flag can be 14 cycles. Thus, at time t2 (cycle 14), an empty flag (FIFO_EMPTY_N) can be de-asserted high.

It is assumed that no other read or write operations occur between times t0 and t3.

At about time t3 (cycle 20), another write operation can write two more data values (D2, D3) into the FIFO. Consequently, at time t4 (cycle 34), an almost empty flag (FIFO_AEMPTY_N) can be de-asserted high.

FIG. 12E is a timing diagram showing a FIFO empty flag assertion operation according to another embodiment. In the particular embodiment shown, a FIFO operation corresponds to that of FIG. 12D, asserting an "almost empty" flag when less than four data write locations store data. Further, it is assumed that prior to time t0, the FIFO stores ten data values.

At about time t0, read operations can start with read clock RCLK transitioning high, while a read enable (FIFO_R_EN_N) is asserted low. Such an operation reads out the $10^{th}/9^{th}$ data values (Q LAST-9, Q LAST-8). On each subsequent rising transition of RCLK (t1, t2, t3, t4), two more data values are read out.

Read data are output after time t2, with a read valid signal (FIFO_QR_VALID) being asserted low.

Referring still to FIG. 12E, the read operation at time t3 accesses the $4^{th}/3^{rd}$ data values (Q LAST-3, Q LAST-2), thus placing the FIFO into an almost empty state. Consequently, in response to this read operation, the almost empty flag (FIFO_AEMPTY_N) is asserted low at time t5. Further, the read operation at time t4 accesses the last two data values (Q LAST-1, Q LAST), emptying the FIFO. Consequently, in response to this read operation, the empty flag (FIFO_EMPTY_N) is asserted low at time t6.

It is noted that following the read operation at time t4, RCLK continues to transition high two more times, while a read enable (FIFO_R_EN_N) is asserted, indicating two more read operations. However, because the FIFO is empty, such read operations are invalid.

FIG. 12F is a table showing examples of latencies for various flags according to a particular embodiment. It is understood that such values represent but one particular embodiment.

Figure 13:
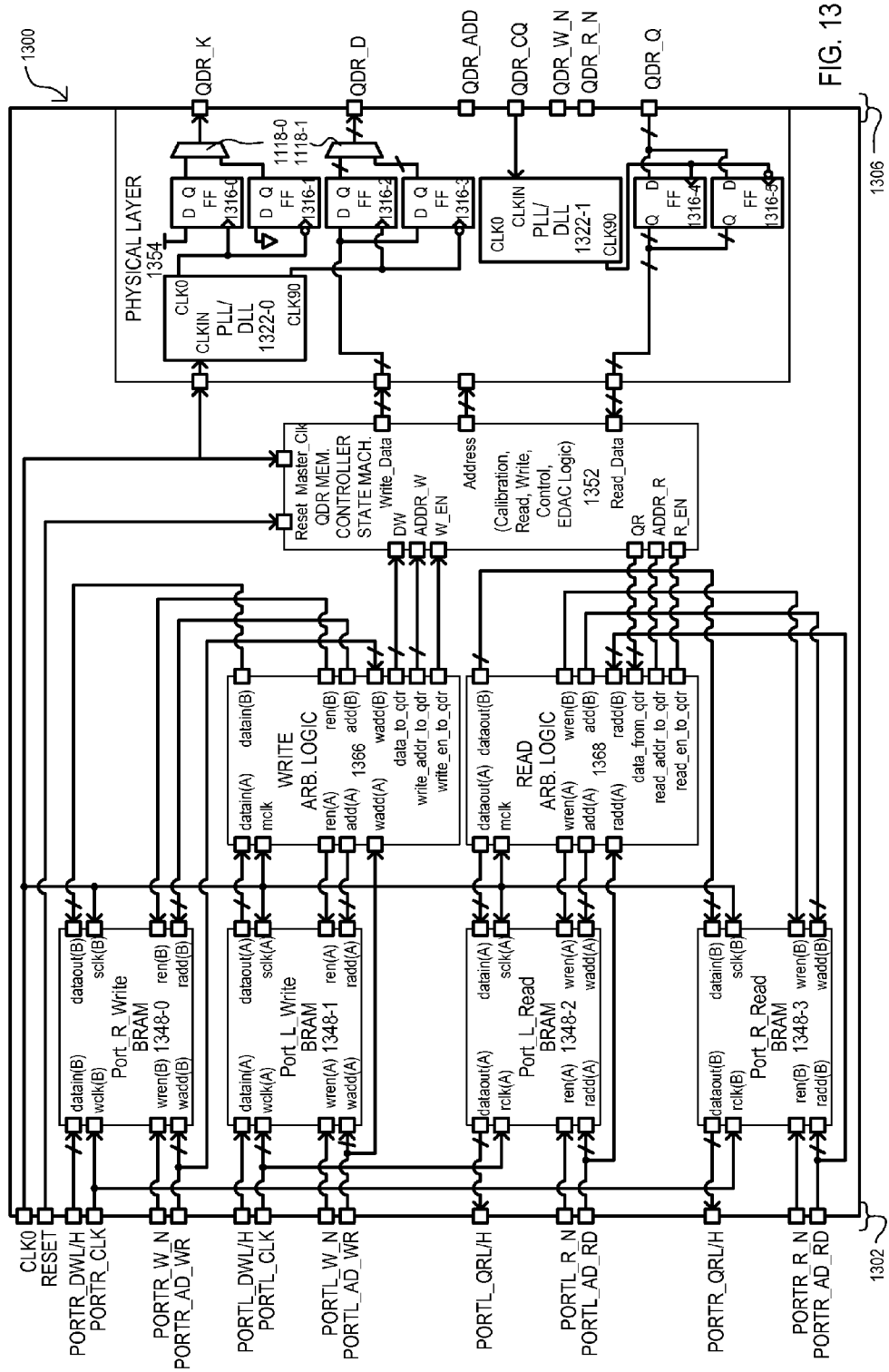
FIG. 13 is a block schematic diagram of a dual port memory controller device according to an embodiment.

Another alternate embodiment can include a controller device to enable multi-port memory operations with QDR type memory devices, as described herein, or equivalents. FIG. 13 shows a dual port type implementation according to one particular embodiment.

Figure 19:
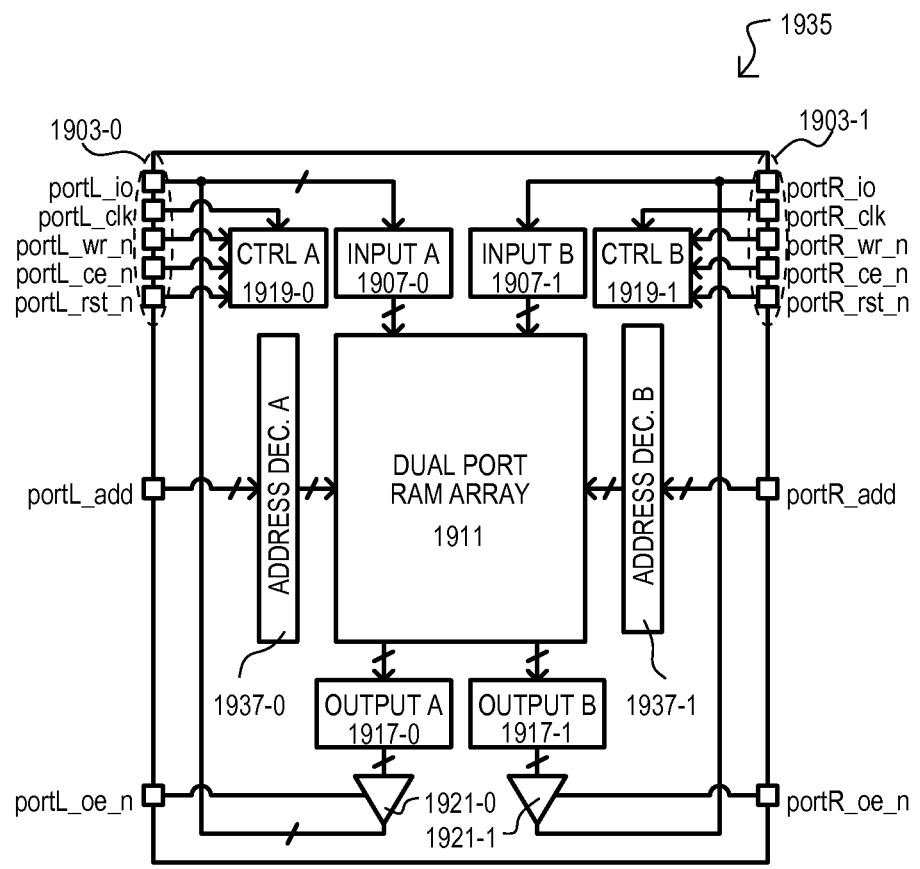
FIG. 19 is a diagram showing a conventional dual port static random access memory (SRAM).

FIG. 13 shows a controller device 1300 that can be included to replace a dual port memory device (like that shown in FIG. 19) with a single port QDR type memory device with a read data output separate from a write data input, both employing DDR architectures. While FIG. 13 shows a two port device (PORTR, PORTL), alternate embodiments can include more than two ports.

A controller device 1300 can include buffer write memories (buffer RAMs or BRAMs) 1348-0/1, buffer read memories (buffer RAMs or BRAMs) 1348-2/3, write arbitration logic 1366, read arbitration logic 1368, a QDR memory controller 1352, and a physical layer section 1354.

A physical layer section 1354 and QDR memory controller 1352 can operate like those shown in FIG. 9, or equivalents.

Buffer memories 1348-0 to -3 and arbitration logic 1366/1368 can implement dual port functionality. Controller interface 1302 can employ synchronous read and write operations. As shown in FIG. 13, each port can have separate write buffer memories (1348-0/1) and read buffer memories (1348-2/3) that feed read/write requests, addresses, and write data to their respective arbitration logic (1366/1368).

It is noted that arbitration logic (1366/1368) can depart from conventional dual port collision hardware, where both ports of a RAM can be accessed at the same location at the same time (such as FIG. 19), which can require complex or specialized arbiter circuits. In contrast, in the embodiment of FIG. 13 arbitration logic (1366/1368) can sequence addresses and data for the two read or two write ports, and configures them in a format suitable for the corresponding QDR device (not shown).

FIG. 14 is a state diagram of arbitration logic 1470 that can be included in embodiments. Arbitration logic 1470 can be included for both read and write access arbitration. If only one port has a read or write request, access will be granted (PortL Grant 1472, PortR Grant 1474) to a QDR memory controller. If both ports request access, the arbitration logic 1470 can switch between the two ports (else from 1472 and 1474 if access is not granted from the port, PortR_req from 1472 if PortL Grant, PortL_req from 1474 if PortR Grant).

FIG. 15 is a table showing connections that can be included in a controller interface 1302, according to an embodiment.

Having described a controller device according to one embodiment in FIG. 13, various operations of such a device will now be described with reference to timing diagrams.

Figure 16A:
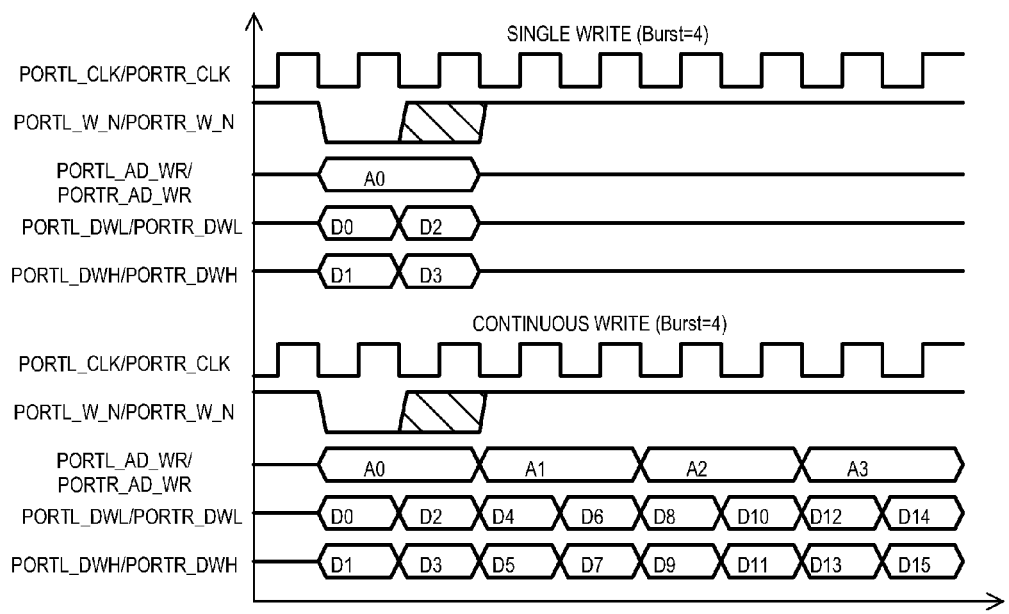
FIG. 16A is a timing diagram showing dual port write operations with bursts of four data values according to an embodiment.

FIG. 16A is a timing diagram showing dual port write operations with bursts of four data values according to an embodiment. FIG. 16A shows controller interface signals for a single write having a burst of four data values, as well as a continuous sequence of writes, each with a burst of four data values.

Figure 16B:
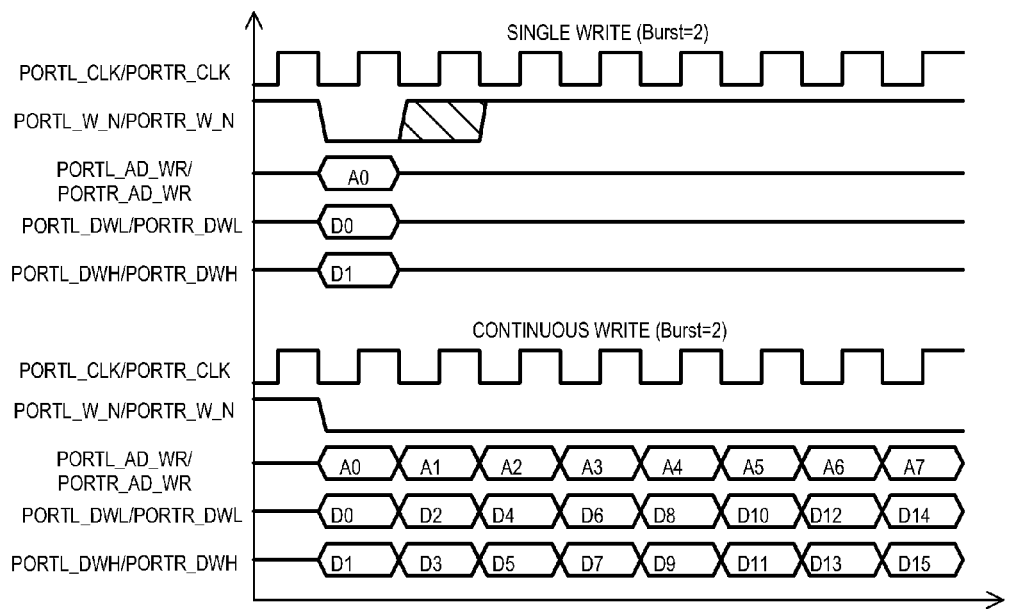
FIG. 16B is a timing diagram showing dual port write operations with bursts of two data values according to an embodiment.

FIG. 16B is a timing diagram showing dual port write operations with bursts of two data values according to an embodiment. Like FIG. 16A, FIG. 16B shows controller interface signals for a single write having a burst of two data values, as well as a continuous sequence of writes, each with a burst of two data values.

Figure 16C:
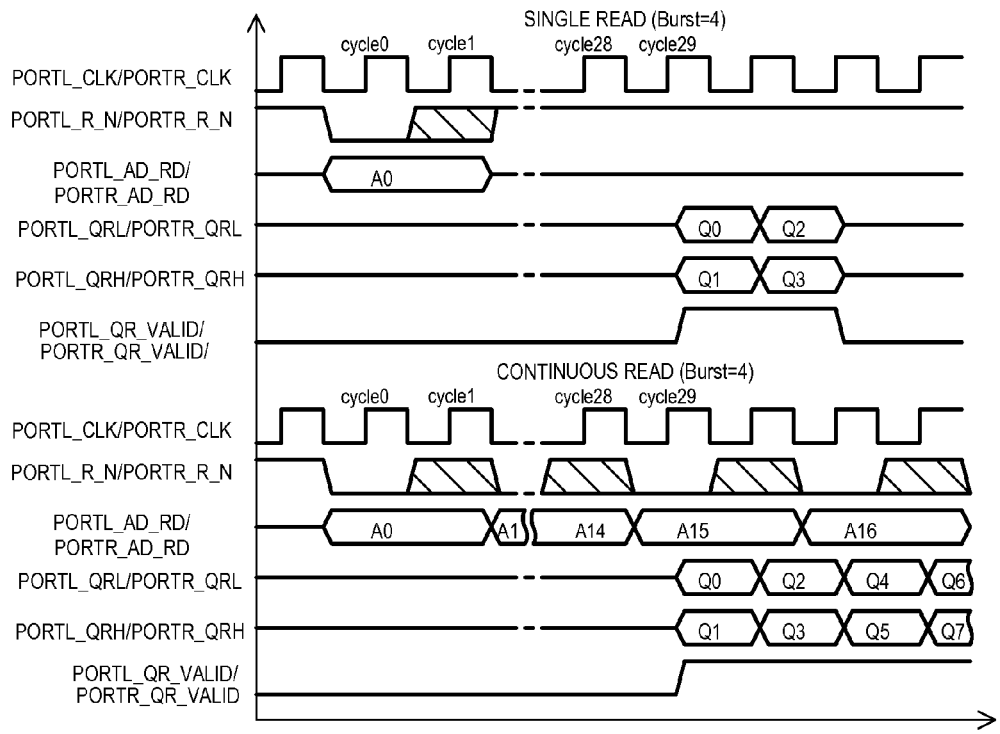
FIG. 16C is a timing diagram showing dual port read operations with bursts of four data values according to an embodiment.

FIG. 16C is a timing diagram showing dual port read operations with bursts of four data values according to an embodiment. FIG. 16C shows controller interface signals for a single read with a burst of four data values, as well as a continuous sequence of reads, each with a burst of four data values.

Figure 16D:
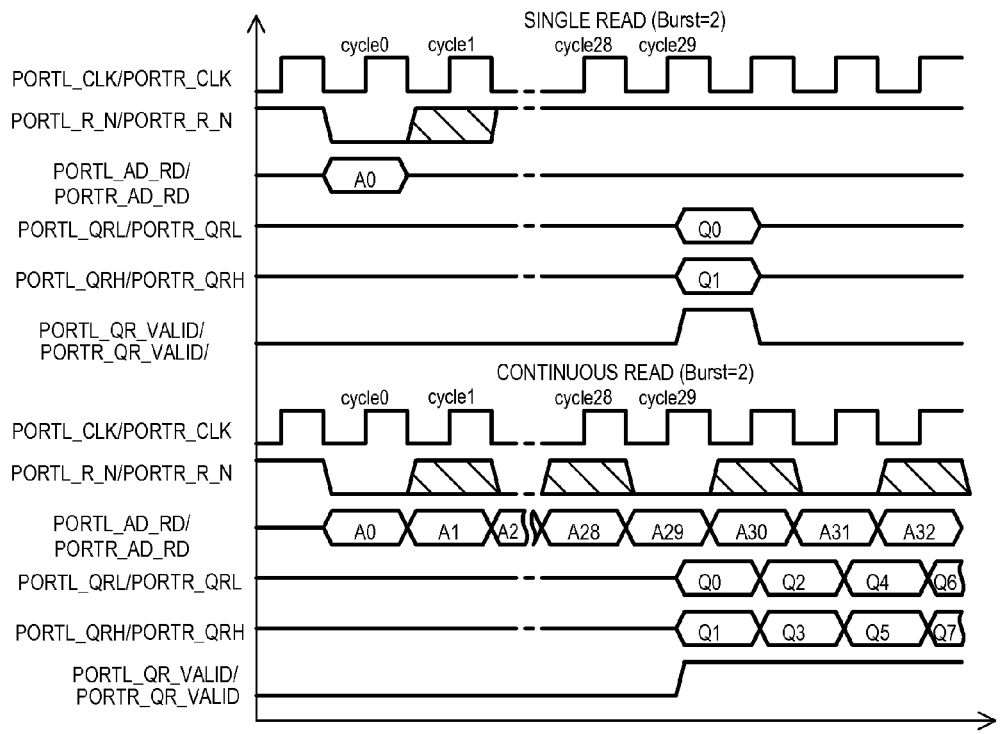
FIG. 16D is a timing diagram showing dual port read operations with bursts of two data values according to an embodiment.

FIG. 16D is a timing diagram showing dual port read operations with bursts of two data values according to an embodiment. FIG. 16D shows controller interface signals for a single read with a burst of two data values, as well as a continuous sequence of reads, each with a burst of two data values.

Figure 17A:
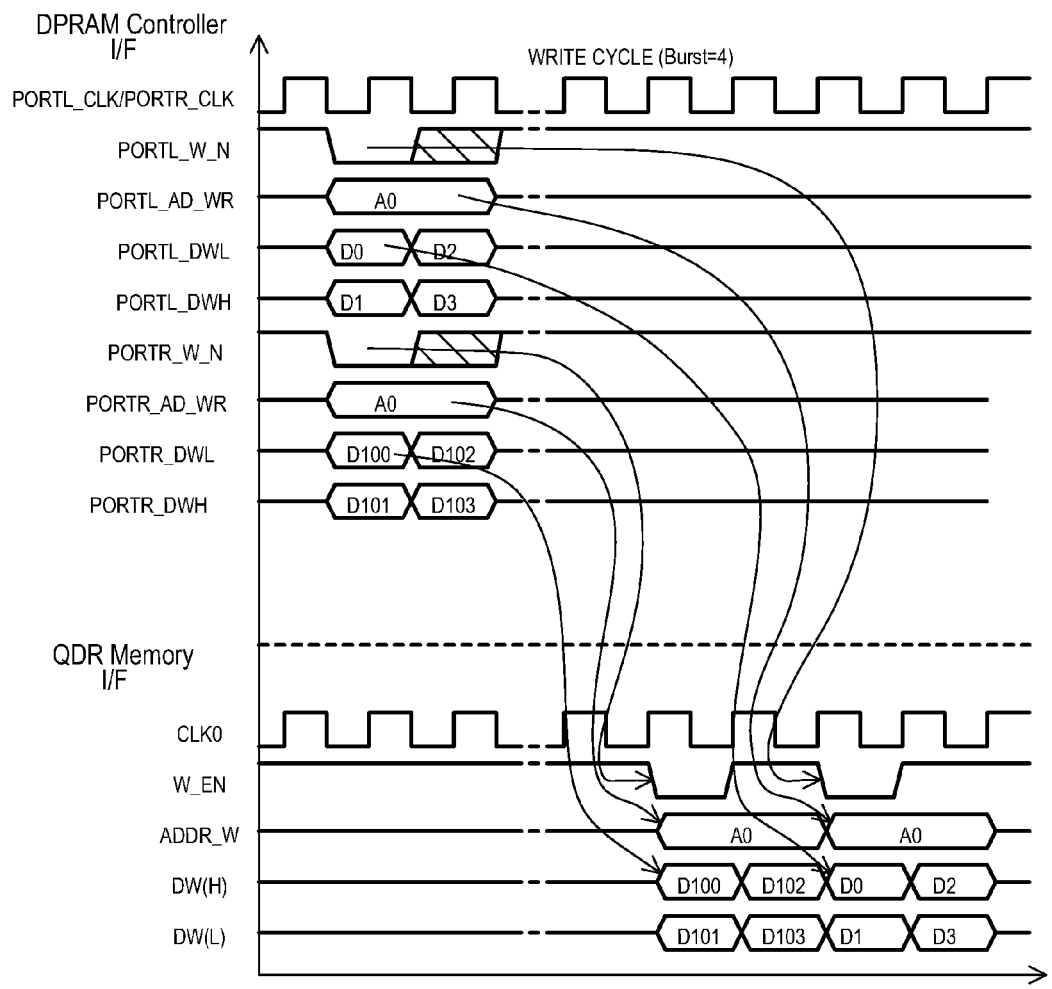
FIG. 17A is a timing diagram showing dual port write arbitration according to an embodiment.

FIG. 17A is a timing diagram showing dual port write arbitration according to an embodiment. FIG. 17A shows controller interface signals (DPRAM Controller I/F) as well as memory device interface signals (QDR Memory I/F). In the embodiment shown, write operations can be received on both ports at the same time. As noted above, write arbitration circuits (e.g., 1366) can order the writes in a predetermined fashion (in this embodiment, ordering a right side port first). The two write enable signals received at the controller interface (PORTL_W_N, PORTR_W_N) can be converted by the QDR controller state machine (e.g., 1352) into sequential write enable signals (W_EN).

Figure 17B:
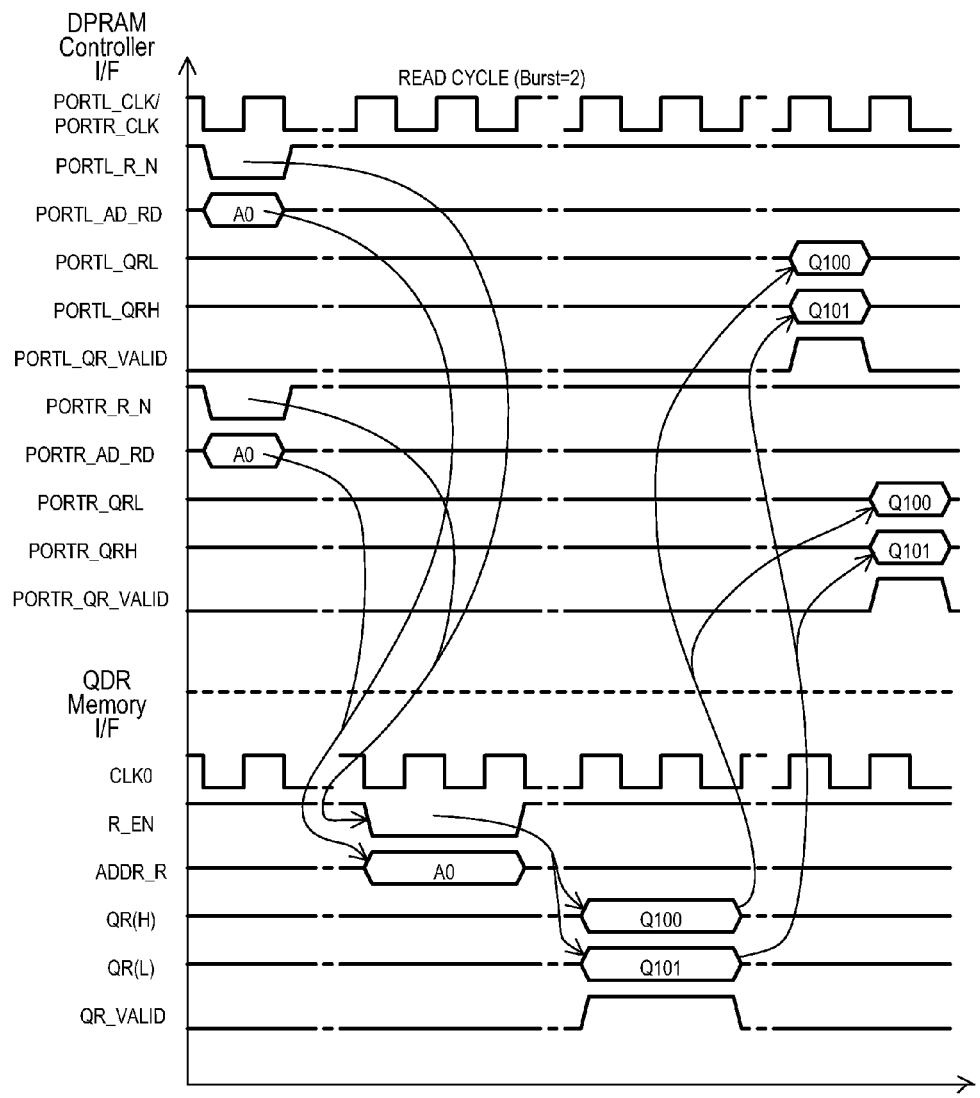
FIG. 17B is a timing diagram showing dual port read arbitration according to an embodiment.

FIG. 17B is a timing diagram showing dual port read arbitration according to an embodiment. As in the case of FIG. 17A, FIG. 17B shows controller interface signals (DPRAM Controller I/F) as well as memory device interface signals (QDR Memory I/F). In the embodiment shown, the two read enable signals received at the controller interface (PORTL_R_N, PORTR_R_N) can be converted by the QDR controller state machine (e.g., 1352) into read enable signals (R_EN). Read requests can be ordered, with read data being output from the left side port before the right side port.

Embodiments of the invention can enable the use of high reliability QDR type memory device to be used in various high reliability applications, such as space applications. In particular embodiments, controller devices can enable a radiation hardened QDRII+® SRAM memory manufactured by Cypress Semiconductor Corporation of San Jose, Calif., to be implemented with numerous system interfaces, including but not limited to: SDR interfaces, FIFO interfaces and multi-port interfaces. This can enable higher density and/or higher memory performance than conventional approaches. Such an implementation may provide for any of: operating frequencies as high 250 MHz, two cycle latency reads, 1 cycle latency writes, burst access operations (e.g., two word, four word), HSTL-15 compliant I/Os, or wide I/Os (e.g., ×18, ×36).

Controller devices as described herein, or equivalents, can enable one QDR memory device, which has been qualified for a high reliability environment, to be used as any of various memory types (e.g., SDR, FIFO, dual port).

It should be appreciated that in the foregoing description of exemplary embodiments, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A device, comprising:
an interface circuit configured to translate memory access requests at a controller interface of the interface circuit into signals at a memory device interface of the interface circuit that is different from the controller interface, the interface circuit including
a write buffer memory configured to store a predetermined number of data values received at a write input of the controller interface, and
a read buffer memory configured to mirror a predetermined number of data values stored in the write buffer memory; wherein
the memory device interface comprises
an address output configured to transmit address values,
a write data output configured to transmit write data on rising and falling edges of a periodic signal, and
a read data input configured to receive read data at the same rate as the write data.

2. The device of claim 1, wherein:
the controller interface includes
at least a write data input configured to receive the write data, and
the interface circuit comprises control logic configured to concatenate the write data values before transmission on the write data output.

3. The device of claim 1, wherein:
the controller interface comprises a first-in-first-out (FIFO) memory interface, including a write enable input, a FIFO write input, a read enable input, and a FIFO read output; wherein
the interface circuit is configured to store data values at the FIFO write input in response to a first signal at the write enable input, and output stored data values in a first-in-first-out fashion on the FIFO read output in response to a second signal at the read enable input.

4. The device of claim 3, wherein:
the write buffer memory is coupled between the controller interface and the memory device interface, and
the read buffer memory is coupled between the controller interface and the memory device interface.

5. The device of claim 4, wherein:
the interface circuit further includes
a FIFO controller circuit configured to access the write buffer memory to output write data values from the write buffer memory on the write data output in response to the write buffer memory being filled, and input read data values to the read buffer memory in response to storage locations becoming available due to data being read from the read buffer memory via the FIFO read output.

6. The device of claim 3, wherein:
the controller interface further includes at least one flag output configured to provide a flag reflecting a status selected from the group of: a FIFO full indication, a FIFO almost full indication, a FIFO empty indication, and a FIFO almost empty indication.

* * * * *